United States Patent
Sutton et al.

[11] Patent Number: 5,842,190
[45] Date of Patent: Nov. 24, 1998

[54] SYSTEM AND METHOD FOR HIGH SPEED COMPUTING AND FEATURE RECOGNITION CAPTURING ASPECTS OF NEOCORTICAL COMPUTATION

[75] Inventors: Jeffrey P. Sutton, Brookline, Mass.; James A. Anderson, Barrington, R.I.

[73] Assignees: Brown University Research Foundation, Providence, R.I.; The General Hospital Corporation, Boston, Mass.

[21] Appl. No.: 682,436

[22] Filed: Jul. 17, 1996

[51] Int. Cl.$^6$ ............................................. G06F 15/18
[52] U.S. Cl. ............................. 706/28; 706/26; 706/27
[58] Field of Search ................................. 395/23, 24, 22; 706/25, 26, 27, 28

[56] References Cited

PUBLICATIONS

Anderson, J.A., et al. (1977), Distinctive features, categorical perception, and probability learning: some applications of neural model. Physchological Reivew: 84, 413–451.

Anderson, J.A. et al. (1995), A metwork of networks: Computation and neurobiology. World Congress of Neural Networks, 1, 561–568 Jul. 18, 1995.

Guan, L., et al., (submitted), A network of networks processing model for image regularization. IEEE Trans Neural Networks Jan. 1997.

Sutton, J.P., (1995), Nested neural networks and cortical pathology. World Congress Neural Networks, vol. 1, 569–572 Jul. 18, 1995.

Sutton, J.P. (In press), Modeling cortical disorders using nested networks. In R. Berndt, J. Reggia & E. Ruppin (Eds.). Neural Modeling of Brain and Cognitive Disorders New Jersey; World Scientific Jan. 1996.

Sutton, J.P. et al. (1995), Computational and neurobiological features of a network of networks. In J.M. Bower (Ed.), Neurobiology of Computation (pp. 317–322). Boston: Kluwer Academic (1994).

Sutton J.P. et al., (1988), Hierarchical model of memory and memory loss. J. Phys. A: Math. Gen. 21, 4443–4454.

Anderson, J.A., et al., (1990) Radar Signal Categorization Using a Neural Network, Proceedings of the IEEE, vol. 78, No. 10, pp. 1646–1657.

Anderson, J.A., (1992), Neural–Network Learning and Mark Twain's Cat, IEEE Communications Magazine, pp. 16–23.

Anderson, J.A., The BSB Model: A simple nonlinear autoassociative Neural Network, M. Hassoun (ed) Associative Neural Memories, pp. 77–102 (1993).

Anderson, J.A., Seven times Seven in about 50: Learning Arithmetic with a Neural Network.

Anderson, J.A. et al., Distinctive features, categorical perception, and probability learning; some applications of a neural model, Psychological Review 84:413–451, 1977.

*Primary Examiner*—Allen R. MacDonald
*Assistant Examiner*—Sanjiv Shah
*Attorney, Agent, or Firm*—Wolf, Greenfield & Sacks, P.C.

[57] ABSTRACT

A network of networks system and method includes a neuron having processing capabilities; a first level module including a network of a plurality of interconnected neurons, the first level module also having processing capabilities; and a second level module including a network of interconnected networks or interconnected neurons, the second level module also having processing capabilities; wherein the first and second level modules are interconnected through neuron to neuron connections such that simultaneous processing can be carried out at by the neuron and by the first and second level modules. The system and method also includes means for forming a boundary between a first module having a first memory state and a second module having a second memory state such that the module comprising the boundary attains a third memory state distinct from the first and second memory states.

12 Claims, 16 Drawing Sheets

NETWORK OF NETWORKS
TRIAL: 5 ITERATION: 35

Fig. 7

ITERATION: 20

ITERATION: 48

SYSTEM AND METHOD FOR HIGH SPEED COMPUTING AND FEATURE RECOGNITION CAPTURING ASPECTS OF NEOCORTICAL COMPUTATION

FEDERALLY SPONSORED RESEARCH

This invention was made with government support under Contract No. N00014-19-J-4032 awarded by the Office of Naval Research. The United States government has certain rights in the invention.

FIELD OF THE INVENTION

The present invention generally relates to a neural network method and system and, more particularly, to a "Network of Networks" method and system. The system and method of the invention importantly are able, without intervention from any external source, to map features and combinations of features of input stimuli in a theoretically infinite progression, such that they are capable of responding in distinctive ways to the features or combinations of features whenever presented. The invention is particularly well-suited to solve complex problems and to model the structure and function of aspects of the human brain for basic scientific and clinical purposes.

BACKGROUND OF THE INVENTION

"Neural networks" are so called because they include a plurality of interconnected neuron-like elements, which respond in certain ways to input stimuli, as do analogous structures of the human brain. They are designed to achieve varying degrees of accuracy based on a number of simplifying assumptions. Neural networks commonly provide an architecture for modeling or constructing systems that "learn" through iterative processing during which the strength of connections between elements of the network is altered, enabling the realization of associations between input and output patterns of potentially great complexity. Neural networks can differentiate among input patterns so that, for example, the input pattern "A" gives rise (maps) to an output pattern or signal "a," input pattern "B" maps to "b," and so on. If constructed in a particular manner, a neural network system can perform standard mathematical or logical operations or calculations such as addition, integration, logical "exclusive or", etc. All such operations will hereinafter be referred to as "computations" for ease of expression.

Neural networks commonly operate with varying degrees of accuracy and may not exhibit the strictly deterministic characteristics of traditional computing means; that is, neural networks may not consistently and accurately, within a precisely known range or accuracy, reproduce a particular output when presented with a particular input. This lack of predictability in some, but not all, neural networks is related to the ability of such networks to continue to evolve so that they exhibit improved performance when presented with new stimuli. Other useful characteristics of neural networks include the ability to continue to function, or to degrade gracefully, in the event that some components of the network become inoperative and, after an initial learning period, to perform computations with respect to large numbers of input variables with much greater speed than is currently practicable with traditional computing means. As the number of input variables grows very large, neural networks may be the only practicable means for computation.

Common applications of neural networks include analysis of data for purposes similar to those for which traditional means of statistical analysis are employed; pattern recognition to permit identification of associations or patterns often in the presence of noise; pattern or signal enhancement, such as image enhancement in the presence of noise; and prediction of future system behavior on the basis of past behavior, often without any a priori knowledge of the architecture of the system.

Some neural network architectures have incorporated or featured a combination of networks that could be described as constituting a "Network of Networks (NoN)". A NoN may be described as consisting of three basic levels, the most elemental being the representation of the smallest computing unit analogous to a neuron, the second being a single network analogous to a group of interconnected neurons, and the third being a network consisting of a group of interconnected networks of neurons. The impetus for creating a NoN may be to increase the range of input patterns that may accurately be differentiated, or, alternatively, to increase the "memory" capacity of the system; to reduce the learning time during which the system achieves the capability for such differentiation; or to decrease the time necessary for performing calculations. These effects are achieved by establishing connections between or among single networks that have the characteristics of preserving the stability of "memory" in each of the networks while correlating the responses of the networks in a useful way.

Prior art NoN architectures suffer from at least four drawbacks. First, the number and complexity of connections among networks grows rapidly, whether exponentially or in some other non-linear fashion, as the number of networks grows, thus presenting a variety of practical constraints in implementation. Such practical constraints include, for examples, limitations in hardware implementations with respect to heat dissipation and available routes of connectivity, and, in software implementations, with respect to rapidly escalating computing overhead. Second, while the increase in the connections among networks increases the scale of computation, it does not result in a change in the manner of computation; that is, a growing NoN increases computational capacity but does not introduce novel computational abilities.

Third, simple scaling of the architecture from one level (i.e., network of neurons) to another (i.e., network of network of neurons) may not consistently be preserved; that is, the operation and structure of the NoN may not be amenable to description by the same equations or other specifications applicable to each constituent network or to the basic computational unit (analogous to a neuron). This lack of self-similarity or modularity among levels substantially increases the design complexity of the system so that, in the case of a hardware implementation, the same or similar integrated circuits, for example, cannot be used to implement each and every level or, in the case of software implementation, the same or similar subroutine or software module, for example, cannot be used to implement each and every level. Fourth, the manner of connections and dynamics among networks does not correspond to what is known about analogous connections and dynamics in the human brain and central nervous systems in other species. Thus, prior art NoNs depart from fundamental aspects of a proven design from which many useful analogies can be made and insights obtained.

Accordingly, it is a general object of the present invention to provide a NoN system and method that overcomes the drawbacks of prior art NoN systems and methods.

SUMMARY OF THE INVENTION

In one embodiment of the invention, a NoN includes a neuron having processing capabilities; a first level module including a network of a plurality of interconnected neurons, a first level module also having processing capabilities; and a second level module including a network of networks of neurons, the second level module also having processing capabilities. The first and second level modules are interconnected through neuron to neuron connections such that simultaneous processing can be carried out in the neuron and in the first and second level modules.

In one embodiment, the invention further includes means for increasing the levels of interconnected modules while increasing connections no more than linearly.

In an embodiment of the invention, it further includes means for forming non-predefined functional components across modules based on input stimuli during computing by the NoN.

In an embodiment of the invention, the NoN further includes means for forming a boundary between a first module having a first memory state and a second module having a second memory state, both modules being in the same level, such that the module comprising the boundary attains a third memory state distinct from the first and second memory states.

In one embodiment of the invention, the NoN further includes means for forming spatially related functional components across modules based on temporal processing sequences and means for forming temporally related functional components through module processing based on spatially related modules.

In an embodiment of the invention, the connections are between both spatially local and distant modules.

In an embodiment of the invention modules at different levels are self-similar to one another.

In another embodiment of the invention, a method is provided for forming a NoN comprising the steps of:

forming a neuron having processing capabilities; forming a first level module including a network of a plurality of interconnected neurons, the first level module also having processing capabilities; forming a second level module including a network of interconnected networks of interconnected neurons, the second level module also having processing capabilities;

specifying input and output pathways to and from neurons so that an external input may excite the system to provide an output;

processing first level and second level module evolution based on neural network dynamics;

further processing first level module evolution to a stage at which the achievement of an attractor state in at least one first level module influences the activity of at least one other first level module toward or away from an attractor state; and forming a boundary layer of first level modules between other first level modules that influence the activity of at least one other first level module.

In an even further embodiment of the invention, an NoN includes means for forming a neuron having processing capabilities; means for forming a first level module including a network of a plurality of interconnected neurons, the first level module also having processing capabilities; means for forming a second level module including a network of interconnected networks of interconnected neurons, the second level module also having processing capabilities; means for specifying input and output pathways to and from neurons so that an external input may excite the system to provide an output; means for processing first level and second level module evolution based on neural network dynamics; means for further processing first level module evolution to a stage at which the achievement of an attractor state in at least one first level module influences the activity of at least one other first level module toward or away from an attractor state; and means for forming a boundary layer of first level modules between other first level modules that influence the activity of at least one other first level module.

BRIEF DESCRIPTION OF THE DRAWINGS

In the drawings,

FIG. 7 is a graphical illustration of the NON depicted in FIGS. 5 and 6 but at a still later stage of the computer simulation showing a boundary formation based on temporal correlation.

FIGS. 9A–9C are graphical illustrations further depicting the evolution of boundaries in a NoN of the invention;

DETAILED DESCRIPTION

Figure 1:
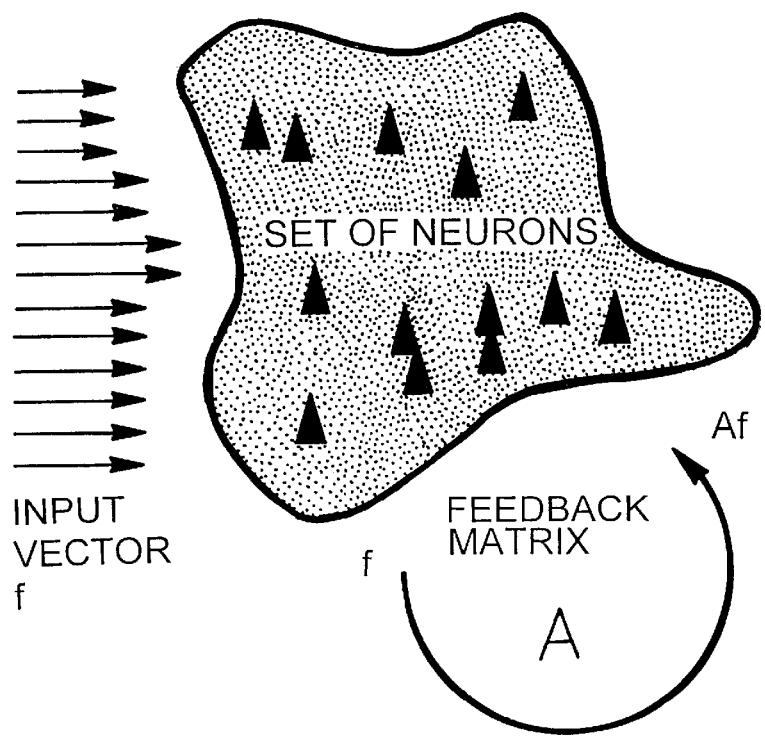
FIG. 1 is a graphical illustration of an exemplary type of neural network, the so-called BSB Feedback Network, that may constitute the model for the first level of modularity (i.e., single network of neurons), of the NoN of the invention.

The detailed description below should be read in conjunction with the accompanying figures in which like reference numerals indicate like structures and method steps. The simple examples included in the description are intended merely to be illustrative. The device, method, and system described are intended to be applicable to complex commercial systems such as might be used for pattern recognition or enhancement, and a variety of other applications to which neural networks may have been applied.

The invention employs a novel architecture of parallel distributed networks of smaller parallel distributed networks that may be implemented in software suitable for operation on currently available personal computers, workstations, or larger computers, or, alternatively, in hardware. In either case, the invention described below, referred to as "the NoN", is characterized by a number of attributes of direct and substantial commercial importance. By way of illustration rather than limitation, these attributes include: the ability of the system to form functional components, such as one able to identify features or combinations of features of an input pattern, as the computation proceeds rather than having such components pre-defined as has been the case with traditional, neural networks or networks of networks; the capacity for expanding indefinitely as the complexity of the computation requires while requiring only a linear expansion of connections among component networks, thus avoiding severe practical restrictions of other designs imposed by exponential or other non-linear expansion of connections; the capacity for connections between geographically disperse networks within the NoN, as well as between local neighbors, thus allowing both distant and neighboring networks to influence computations within a particular network while maintaining the linear scaling characteristic noted above, and the ability to implement the system by the use of identical or highly similar modules at all levels of the network or networks.

The result of this novel and powerful architecture of the invention is that computations, such as, for example, identification of a unique feature or combination of features of an input pattern, can be achieved more quickly than is possible using other means and without any a priori knowledge about such features or even of their existence. The NoN of the invention thus provides a highly flexible computing platform with applications in diverse commercial areas including signal processing and enhancement; security systems, transportation systems, and other systems relying on pattern recognition; systems for forecasting behavior of complex systems such as financial markets, weather, or commercial activity; and many other areas. The attributes of the NoN of the invention and its underlying architecture will now be described in greater detail, followed by a description of the steps that may be taken to realize an embodiment of the invention implemented by software or hardware.

A crucial characteristic of the NoN of the current invention is that structure forms locally based on dynamics of the system. Functional, i.e., informational, components of the NoN literally grow and shrink as computing proceeds. This is very different from traditional computing, where functional units, such as software subroutines or hardware modules, are linked in static ways. In traditional computing, information generally flows from one structure to another; there is a clean mapping between a structure and the function that it performs. The NoN has this characteristic to some extent. Relationships between structure and function, however, get blurred, and this can be advantageous. An important feature of the NoN is the way that the dynamics of the system influence spatial structure, continuous scaling, and the controllability of computations. These points will become more apparent from the following description of the structural components of the NoN as well as the concepts of dynamic development of functional processes.

FIG. 1 is a representation of one kind of associative network, called a BSB Feedback Network, that maps mixed inputs onto individual outputs stored in the network; that is, the network associates an input pattern with a stored memory pattern. Individual computational units analogous to neurons are shown as triangles within the shaded area that constitutes the network of neurons. The first level of modular organization of a NoN consists of such artificial neurons arranged into a single network, such as the BSB Feedback Network. A description of the dynamics and characteristics of a BSB Feedback Network, which was developed by one of the inventors of the present invention, James A. Anderson, and co-workers in 1977, may be found in "The BSB Model: A Simple Nonlinear Autoassociative Neural Network," by James A. Anderson, in *Associative Neural Memories* by M. Hassoun (ed., Oxford Univ. Press, 1993), pp. 77–102, the contents of which are hereby incorporated by reference. It is not necessary for purposes of the present invention that the single network be an associative network such as the one shown in FIG. 1. An important characteristic of the single network, however, for purposes of the present invention, is that the number of stable states or memory patterns that the network may obtain is a very small fraction of the possible number of such states. Moreover, the single network must achieve stability through a non-linear process at a particular "attractor" state that may then be thought of as constituting the "memory" of that single network.

Figure 2:
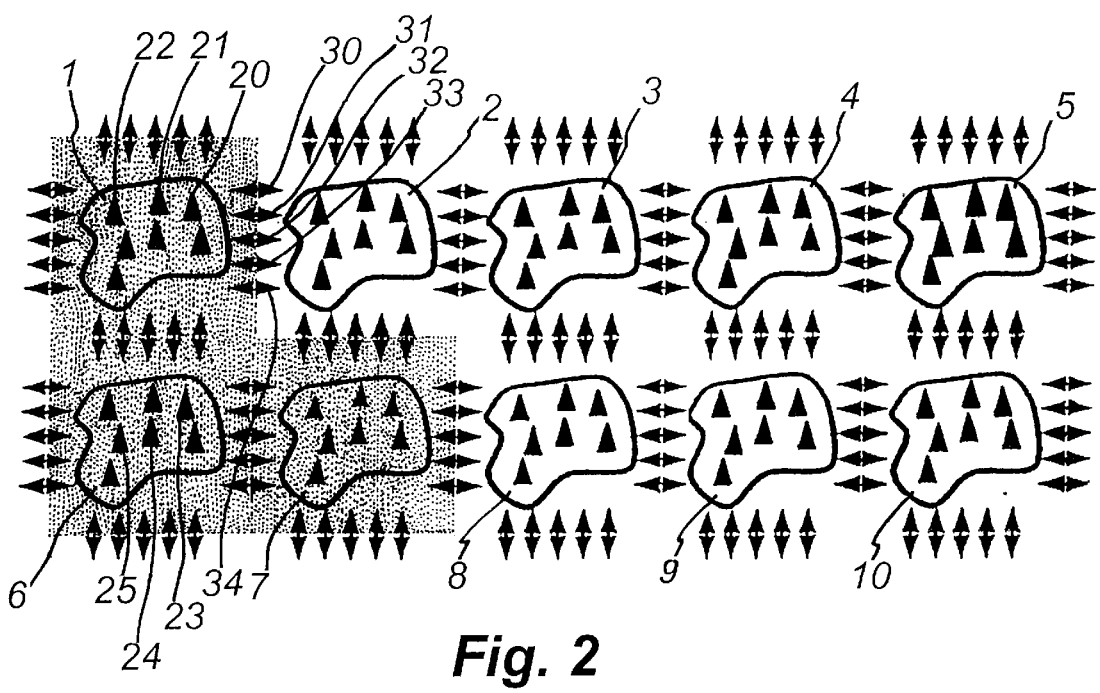
FIG. 2 is a graphical illustration of an exemplary design (including first level networks) of the second level of the NoN of the invention.
Figure 2A:
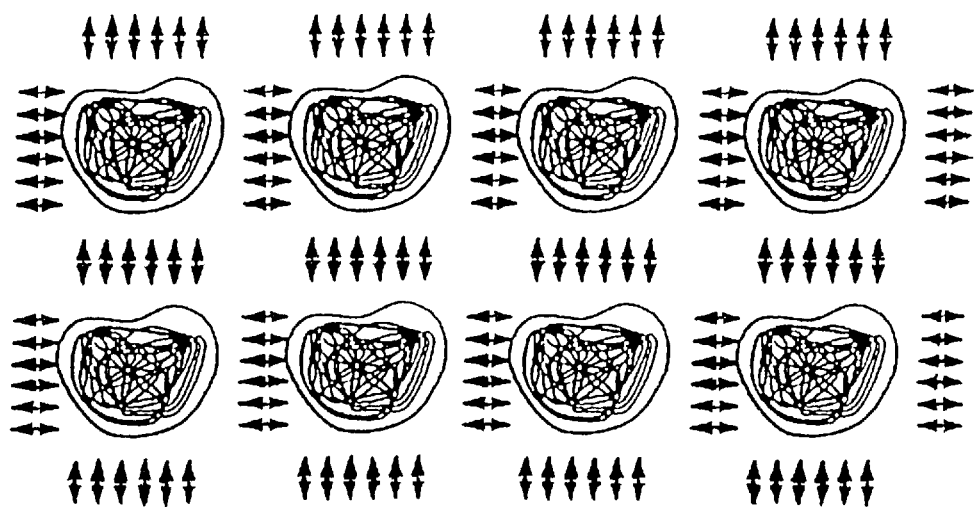
FIG. 2A is a more detailed graphical illustration of the embodiment shown in FIG. 2.

FIG. 2 shows the basic design of one example of what may be called a NoN module at the second level; that is a network of networks of neurons. A module at the third level might consist in this example of a network of the modules at the second level as shown in FIG. 2. A module at the fourth level might consist of a network of the modules at the third level, and this scaling progression could be repeated indefinitely.

Returning to FIG. 2, it is seen that the module consists of ten neural networks, 1 through 10, inclusive, each with its own computational capabilities. Within each such network are basic computational units analogous to neurons, shown as triangles, among which, for example, are neurons 20, 21 and 22 within neural network 1 and neurons 23, 24 and 25 within neural network 6. The double-tipped arrows shown in FIG. 2 as emanating from or connecting between each of the neural networks 1 through 10, inclusive, represent connections (through which communication is accomplished) between "nearest neighbors" of networks. For example, double-tipped arrows 30, 31, 32, 33 and 34 represent the communication connections between neural network 1 and neural network 2. While only those connections between nearest neighbors are shown in FIG. 2, the NoN architecture contemplates additional connections between more distant neural networks. The number of such additional connections might be bounded in any manner that maintains the linearity of scaling attribute of the NoN.

It is an important aspect of one embodiment of the NoN architecture of the invention that each connection between neural networks, for example, connection 30 between neural network 1 and neural network 2 in FIG. 2, is established between individual model neurons. In this way, inter-network connections are not made by the averaged inputs to, or outputs from, a network. Rather than scalar connections between networks, neurons operate as vectors with connections to other neurons, whether they are in the same or different networks. That is, it is generally not the case that computations in one neural network are processed locally and then fed sequentially into another network. Instead, there is simultaneous parallel processing both within and between networks. This behavior is a consequence of having all computations performed locally, i.e., at the neuron level.

Individual neurons follow their local rules, but their collective activity, based on connection patterns and timing, can influence local, intermediate, and global levels of network structure simultaneously.

Figure 3:
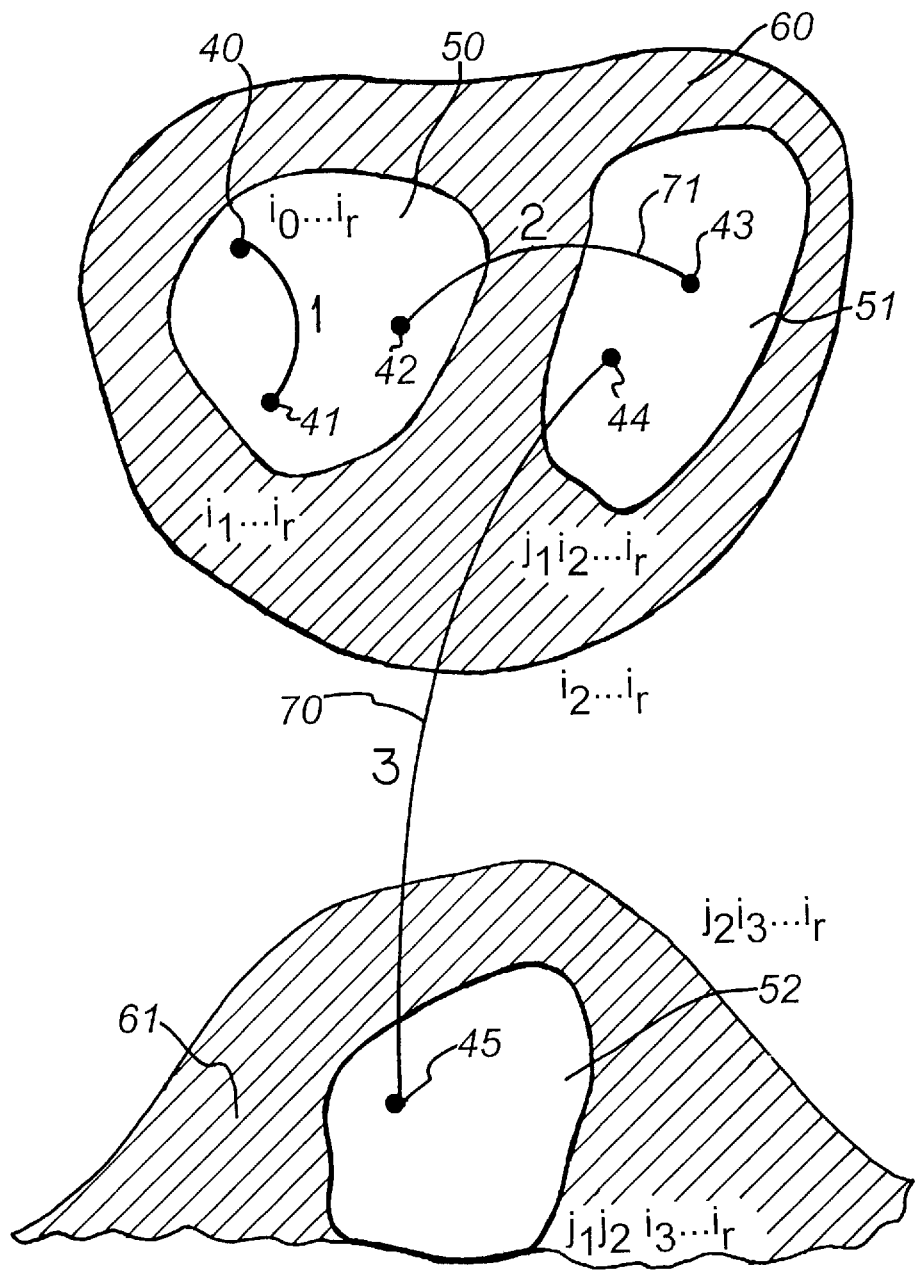
FIG. 3 is a graphical illustration of a prior art inter-network connection that is static, i.e. without dynamic boundary formation.
Figure 4:
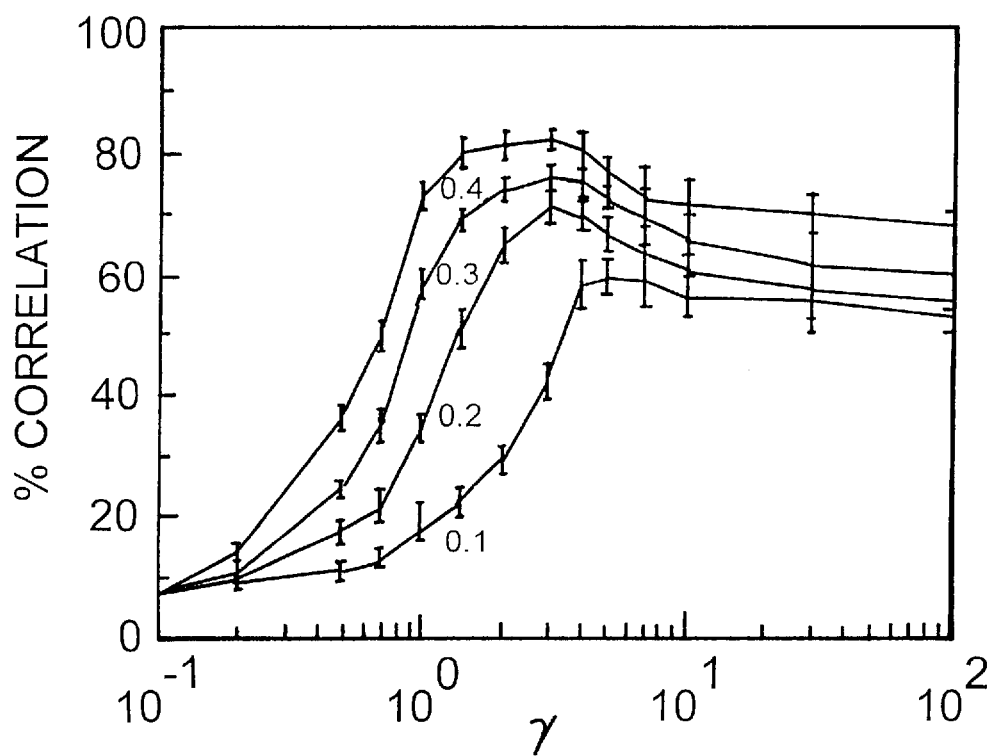
FIG. 4 is a chart showing the memory performance of a prior art NoN across a second level network as a function of the connectivity strength between first level networks.

All inter-network connections, including, for example, connection 30 between neural network 1 and neural network 2 in FIG. 2, satisfy two design parameters. The first design parameter is that there must be a mechanism for linking networks in a manner that: (i) preserves the stability of the information stored in local networks (e.g., firing patterns of artificial neurons corresponding to memory states); (ii) correlates information across networks in a meaningful way such as by linking some subset of attractor, or memory, states between networks; and (iii) does not require too many connections, i.e., preserves the linearity of connection expansion. FIGS. 3 and 4 show how this can be achieved. FIG. 3 is a general schematic diagram illustrating the mathematical development of a NoN with four levels of organization neurons, shown as dots 40, 45, inclusive; networks of neurons, shown as white patches 50, 51 and 52; and two networks of networks, shown as shaded clusters 60 and 61. Also shown in FIG. 2, as lines connecting dots, are inter-network connections, such as connection 70 between neuron 45 in network 52 in network of networks 61 and neuron 44 in network 51 in network of networks 60.

FIG. 4 gives the results of computer simulations showing how the global performance of memory increases as the networks become linked together. When the linkages between the networks become too strong, the associative memory performance of the entire network begins to fall off. FIGS. 3 and 4 demonstrate that it is possible to rigorously construct a network of networks structure and fine tune the connections with respect to topography, density, relative strengths, or temporal lags, so as to modify and enhance the performance of an associative memory at multiple levels. Further discussion of these points may be found in Sutton et al., "Hierarchical model of memory and memory loss", J. Phys. A: Math. Gen., 21, pp. 4443–4454, 1988, which is hereby incorporated by reference. Such an approach, however, does not explain or propose how intermediate levels of structure emerge; nor does such an approach describe the dynamics of boundaries or how the system might adapt to inputs or ongoing activity. The intermediate levels in the model described in Sutton et al., "Hierarchical model of memory and memory loss", J. Phys. A: Math. Gen., 21, pp. 4443–4454, 1988, for example, have to be explicitly programmed, and their boundaries do not vary in time.

Such temporal variation is a key feature of the present invention. In the NoN, spatial clustering of activity among groups of local networks within the NoN itself encodes information. In fact, such spatial clustering can even act to guide and control the very platform that it uses to compute. These concepts may be further elucidated by discussing the properties of individual networks with respect to their information content. This discussion addresses the second design parameter of the inter-network connections in the NoN: the correlation and linkage of information across local networks. The present invention is novel in its treatment and achievement of such correlation and linkage. More specifically, rather than using a NoN to generate an associative memory output, the system can be tuned to form, within itself, new aspects of network organization associated with "boundaries" between adjacent attractor states. Such dynamic features of the NoN have significant computational features associated with them.

Figure 5:
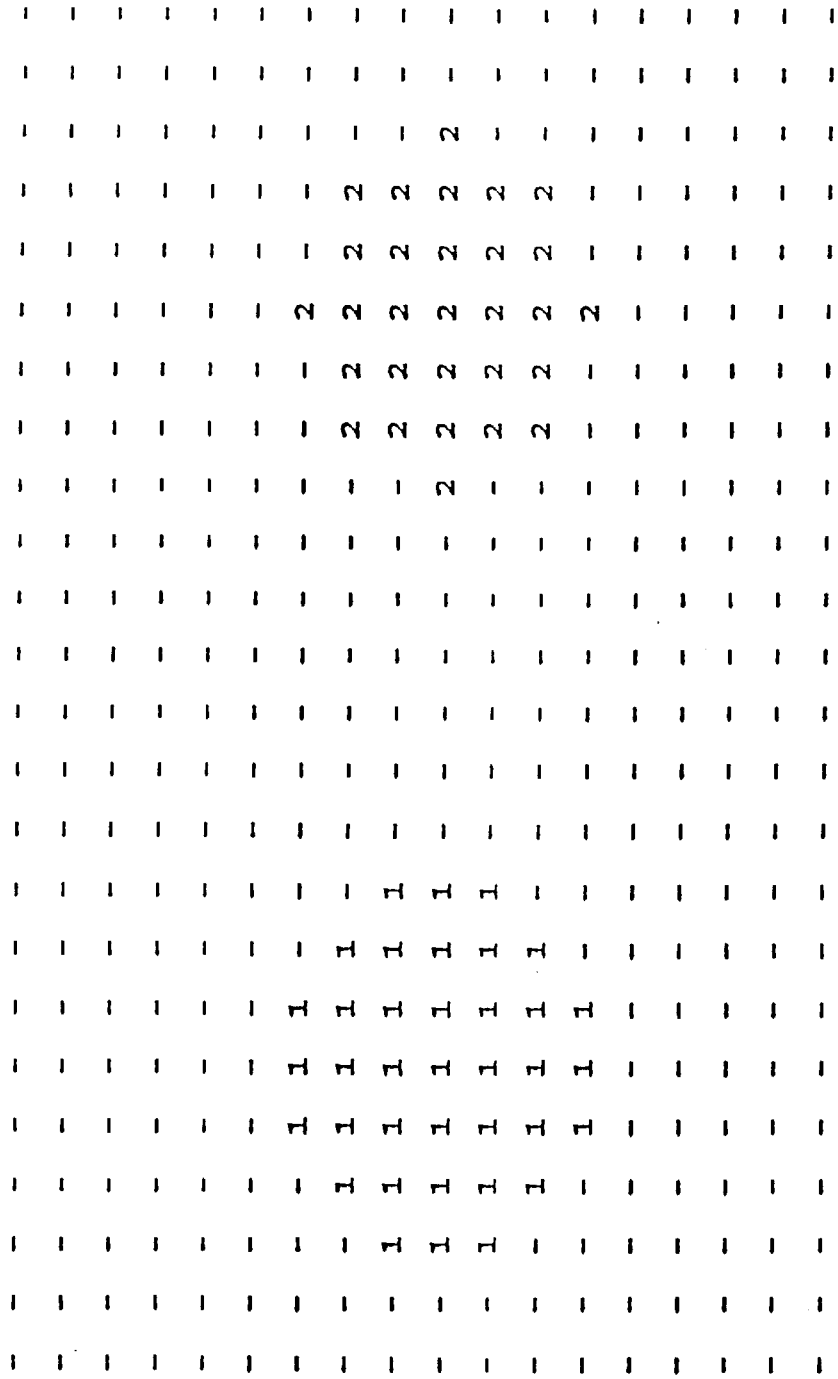
FIG. 5 is a graphical illustration of a NoN according to the invention containing 432 networks represented by dashes and numbers during an iterative computer simulation wherein the networks are arranged in a manner similar to the networks within NoN shown in FIG. 2.
Figure 6:
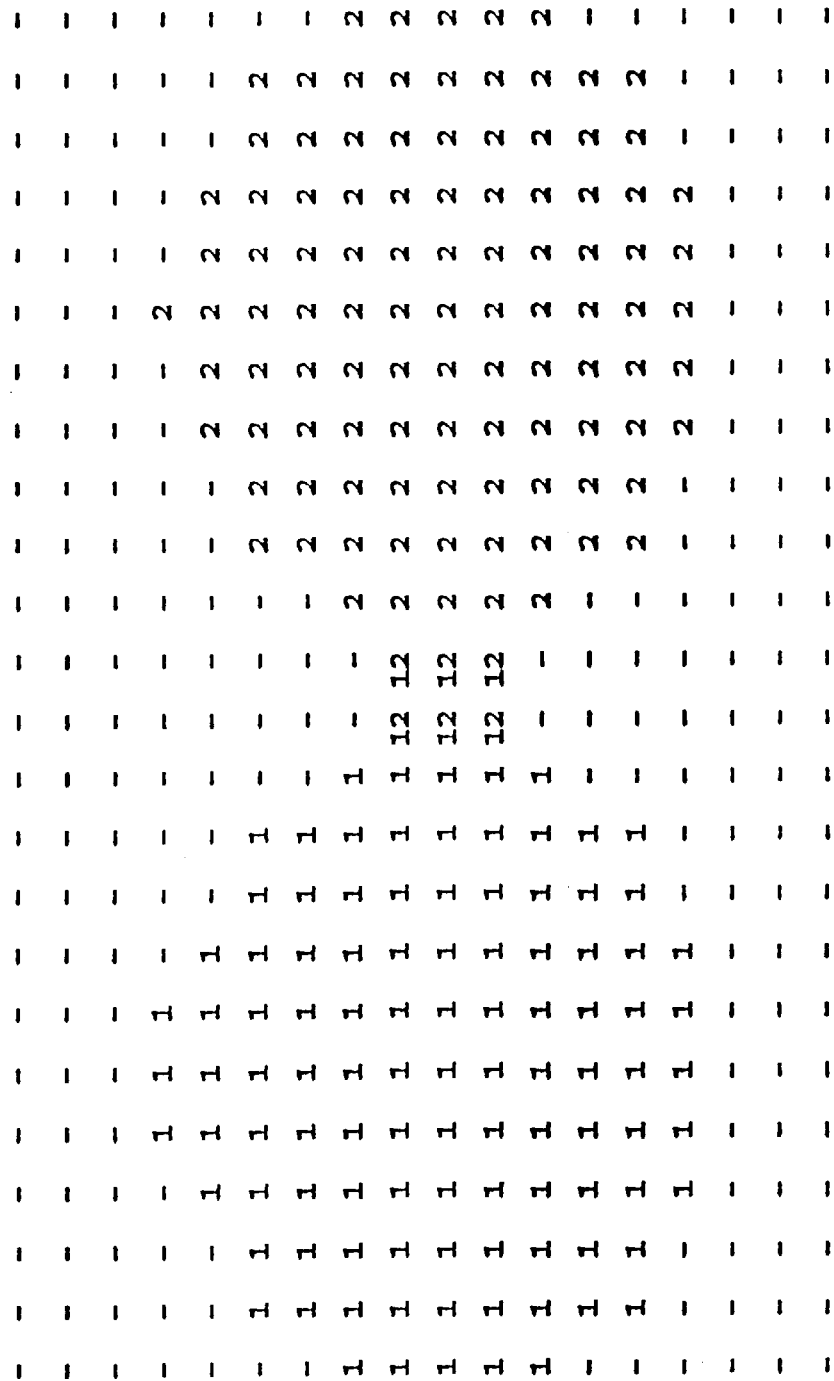
FIG. 6 is a graphical illustration of the NoN depicted in FIG. 5 but at an intermediary stage of the computer simulation showing the beginning of a boundary formation.
Figure 7:
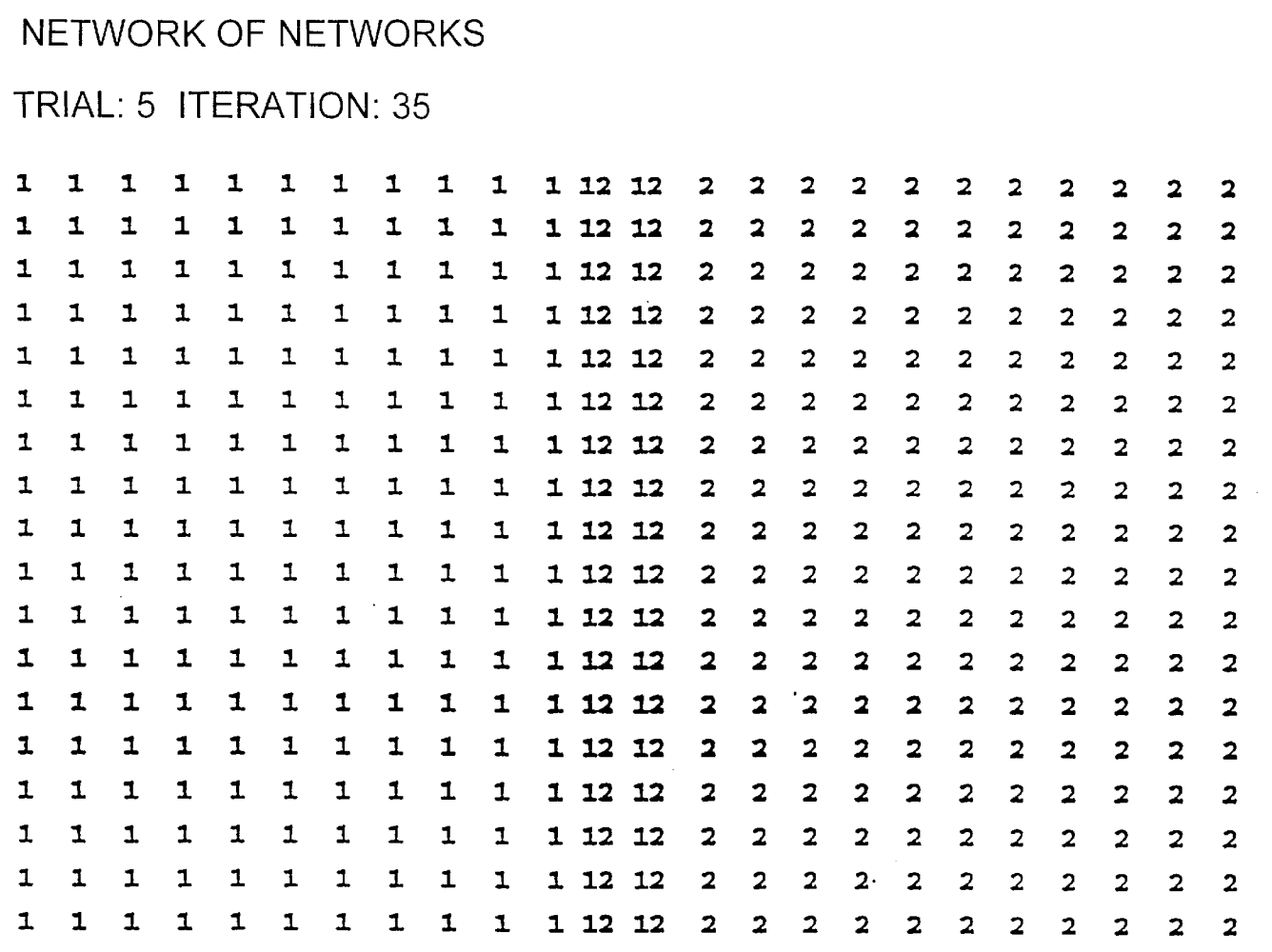

The dynamics of the NoN boundary development can be shown by reference in FIGS. 5, 6 and 7. FIG. 5 shows on exemplary embodiment of the invention containing 432 networks arranged in a similar manner to the NoN shown in FIG. 2. For reference, each dash or number in FIG. 5 is the same size as one of the ten networks shown in FIG. 2. Each of the networks in FIG. 5 may have, for example, associative memory features such as those described with respect to the BSB Feedback Network shown in FIG. 1.

For illustration, the possible attractor state, or memory state of each of the 432 networks is assigned a number from 1 to 20. Furthermore, memory x in one network is correlated with memory x in the networks adjacent to it, where x=1, . . . , 20. A dash signifies that a network is not in a memory state, that is, it has not associated the inputs from the neighboring networks into one of its 20 possible memory stages. Competition among the networks, and external factors, drive the system. FIG. 5 shows the memory states of the 432 networks after 13 iterations of the computer simulation. The NoN has been cued at this stage with two clusters of local networks, one in memory state 1 and the second in memory state 2. These clusters, based on correlated activities of local networks, enclose a dynamic network structure that is intermediate between local networks and the entire network of networks.

FIGS. 6 and 7 show the same NoN as depicted in FIG. 5 after 21 and 35 iterations, respectively, of the computer simulation have occurred. As the NoN iterations continue, a boundary layer emerges between the expanded cluster of local networks in memory state 1 and the expanded cluster of local networks in memory state 2. As shown in FIG. 7, the memory state of the networks within this boundary layer is neither 1 nor 2, but 12, which contains components of 1 and 2 but also other non-linear components such that 12 is not a superposition of 1 and 2. The development of the boundary layer is further depicted in FIG. 8, in which the dotted line 80 corresponds to the transient formation of the boundary layer, which is mediated by spatially and temporally correlated properties of networks 82 and 84.

Figure 9A:
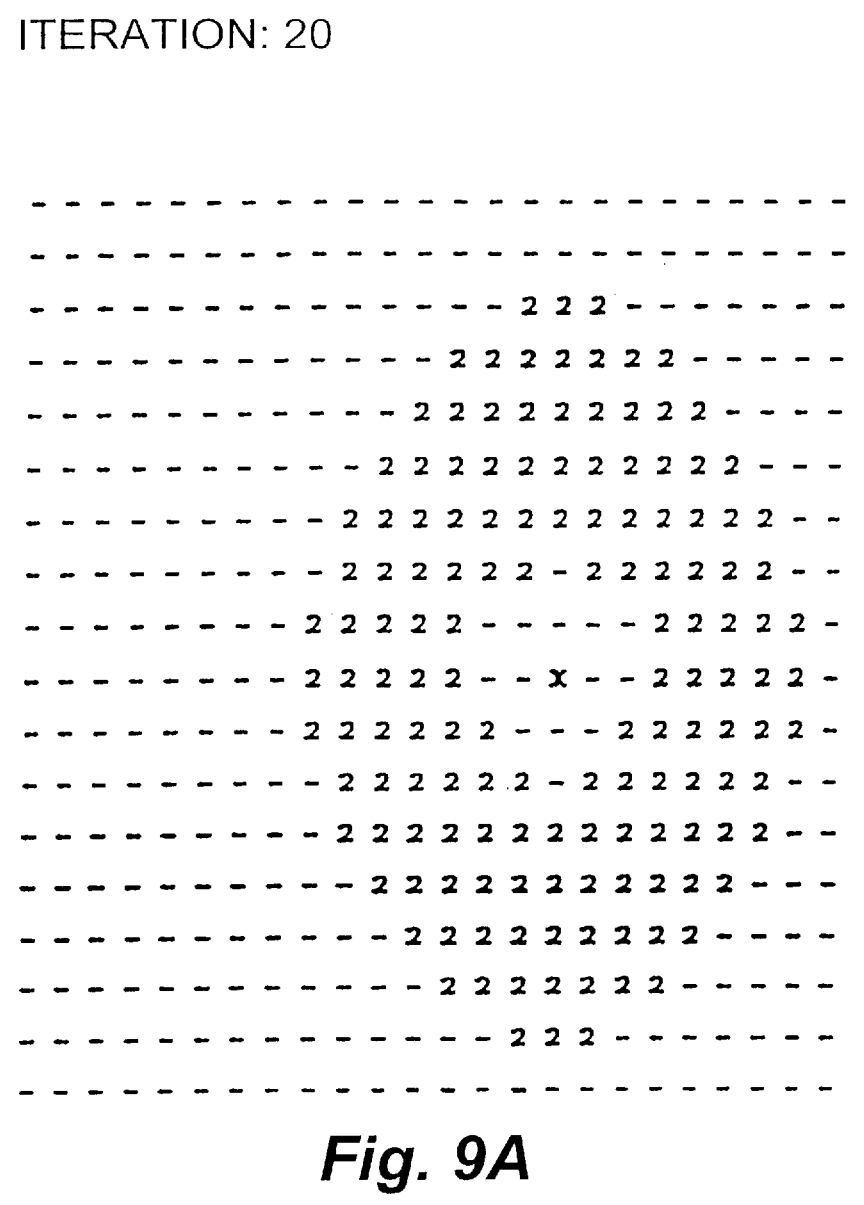
Figure 9B:
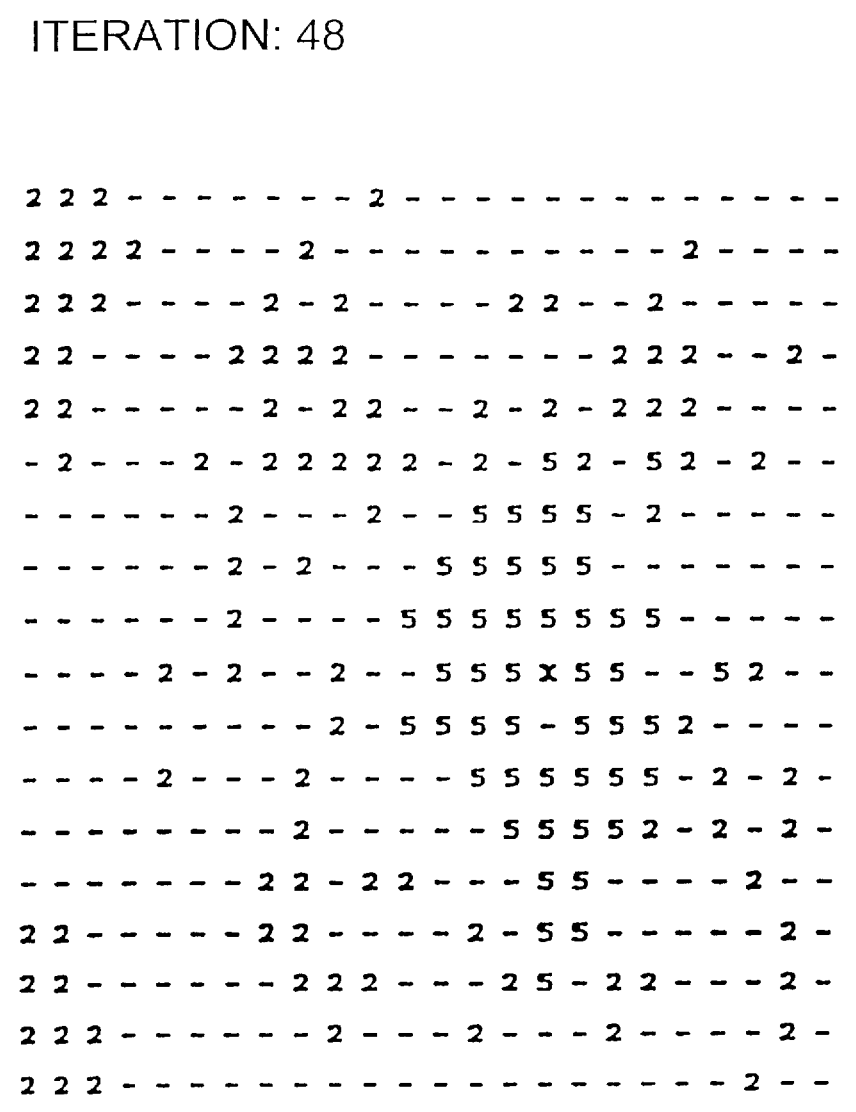
Figure 9C:
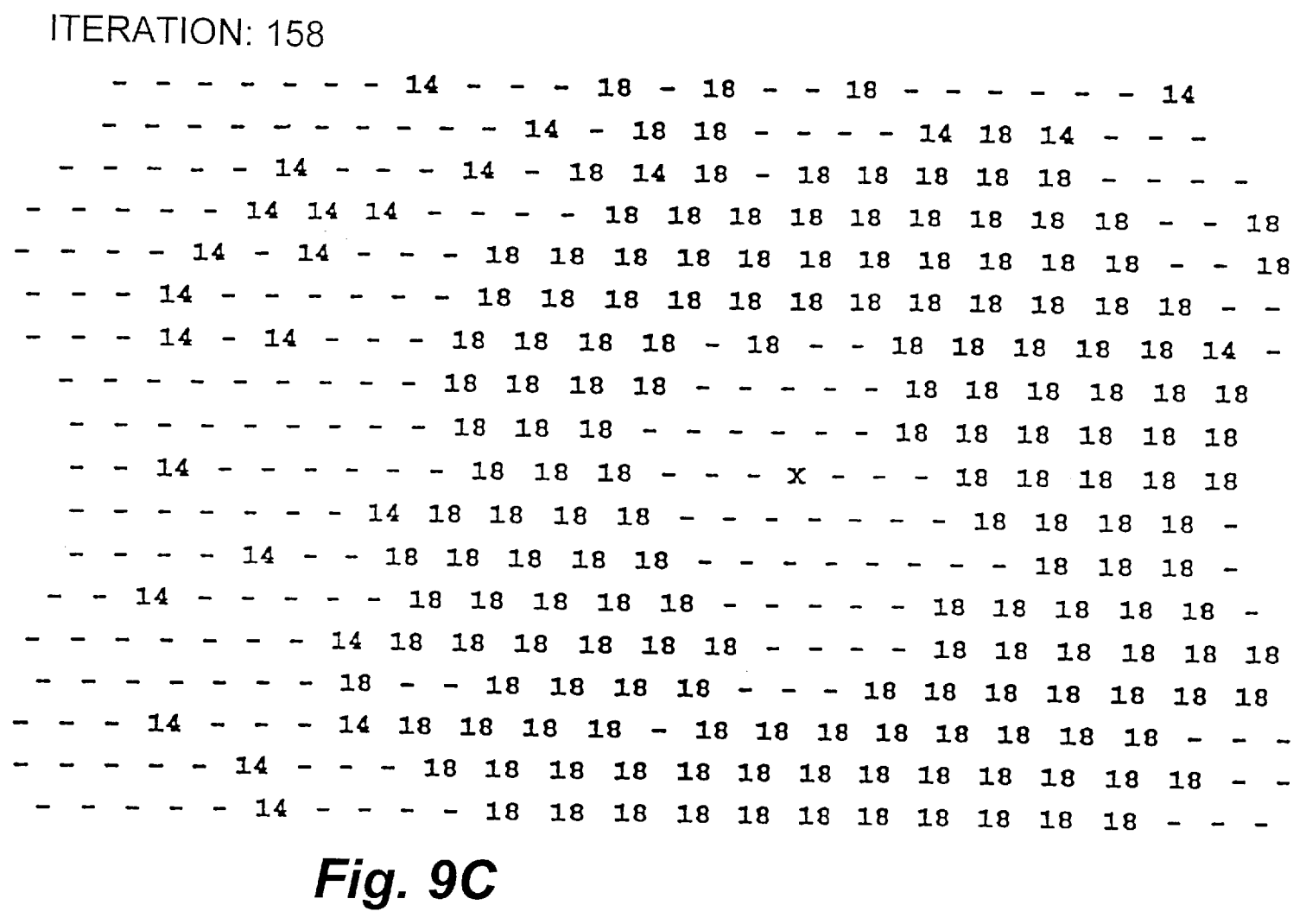

To further illustrate the temporal aspects of the formation of boundary layers, FIGS. 9A, 9B, 9C show how an initial presentation of memory states similar to that on the right side of FIG. 5 can evolve into a temporal sequence of events. Whereas FIG. 5 demonstrates how temporal relationships between networks give rise to spatial relationships, FIGS. 9A, 9B, 9C show the opposite effect. Here, an initial spatial relationship generates a temporal sequence at the level of intermediate network structure. In either case, the NoN has the important self-guided ability to amplify the most useful inputs and suppress less useful information.

The implications of spontaneous boundary formation and evolution are several fold. First, spatial organization of sub-NoN structures can arise from the temporal correlations of networks alone. There is no need to re-wire the circuitry, or re-program the computer software, for intermediate levels of structure. Second, there is an essentially infinite, i.e., astronomically large finite, number of intermediate spatial forms that can encode information. Third, the time-varying nature of the NoN allows such encoding to be useful for adaptive capabilities. Fourth, the scaling of spatial organization is essentially continuous; that is, it is discrete but only at the level of individual networks. Analog features have many advantages over discrete jumps in levels of organization. Fifth, the scaling laws are the same throughout the network; that is, connect together many similar units and the translational invariance across the network is a useful medium for multi-level processing. The multiple levels arise from networks nested within other networks. Sixth, higher level functions can be localized at or between any level, but the coordinated efforts across networks is correlated with the global controllability of the network of networks. The emergence of intermediate and dynamic levels of structure is testament to inherent control, thereby obviating the need for a control center or CPU to coordinate computations.

Figure 10:
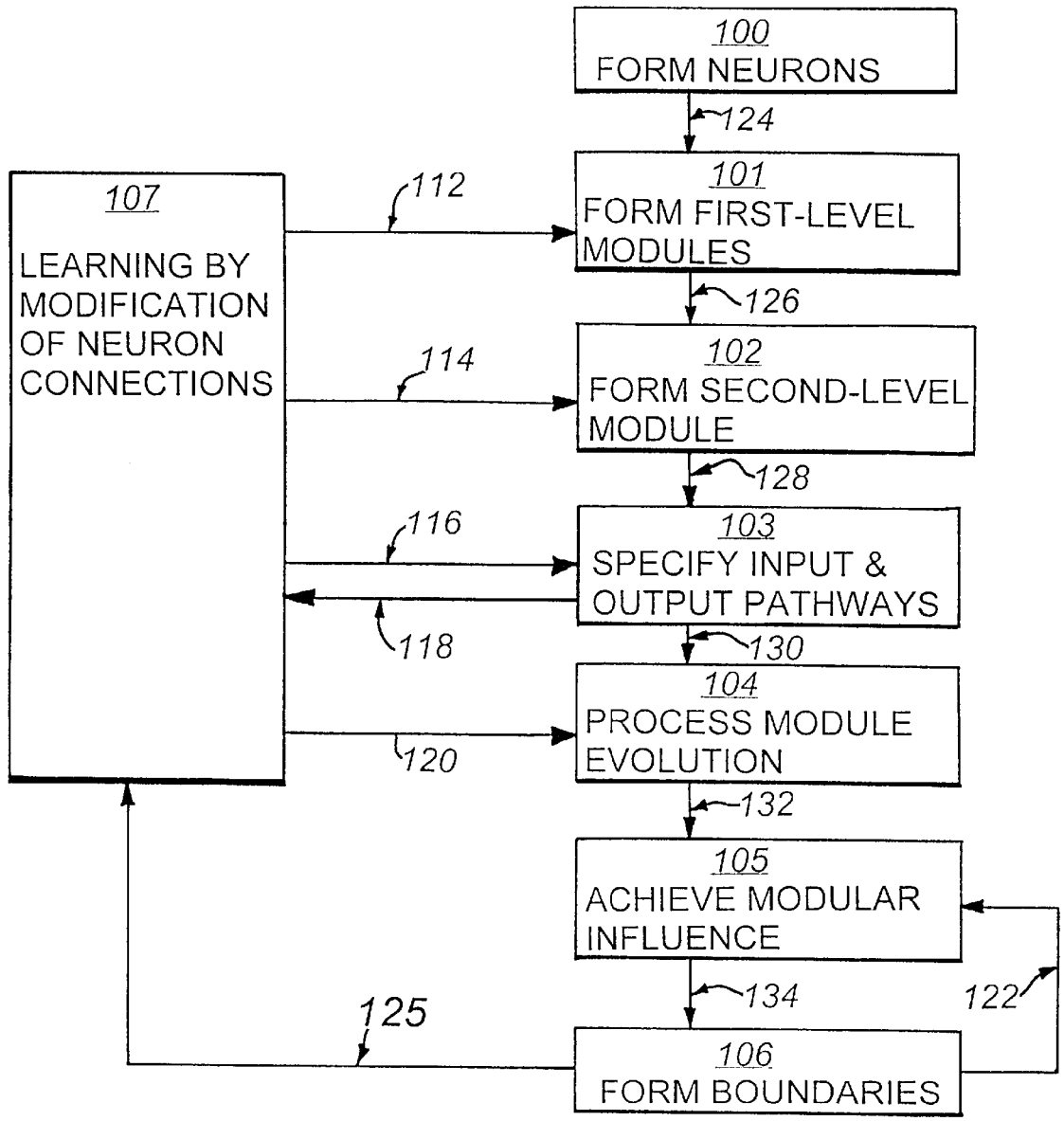
FIG. 10 is a functional block diagram of the major functional parts of an embodiment of NoN of the invention.

An embodiment of the invention, which can be implemented by software or hardware, will now be described in general terms in conjunction with a simple illustrative example with reference to the block diagrams and flow diagrams depicted in FIGS. 10 through 16. This embodiment is of a three- tier system including a computational unit analogous to a neuron (referred to henceforth simply as a "neuron-analog" or "neuron"), a first level module comprising a network of neurons, and a second level module comprising a network of networks of neurons, that is, a network of first level modules. As shown in FIG. 10, the major steps in the formation of this embodiment of the NoN include: (i) as represented by step 100, formation of a plurality of neurons, each representing a basic computational unit; (ii) as represented by step 101, and proceeding from the formation of a plurality of neurons as represented by line 124, formation of a first level module comprising a network of neurons and replication of the first level module to form a plurality of first level modules; (iii) as represented by step 102, and proceeding from the formation of first level modules as represented by line 126, formation of a second level module by the interconnection of first level modules, thereby comprising a network of networks of neurons; (iv) as represented by step 103, and proceeding from the formation of the second level module as represented by line 128, specification of input and output pathways to and from neurons so that an external input may excite the system and the system's output may be observed, recorded or utilized; (v) as represented by step 104, and proceeding from the specification of input and output pathways module as represented by line 130, proceeding to a process of module evolution; (vi) as represented by step 105, and proceeding from module evolution further processing of such module evolution to a stage at which the achievement of attractor states in some first level modules influences the activity of other first level modules toward or away from attractor states; (vii) as represented by step 106, and proceeding from the further processing of module evolution as represented by line 134, formation of boundary layers of areas within and between first level modules that, as represented by line 122 influences the further processing of module evolution as represented by step 105; and (viii) as represented by step 107, and proceeding from the formation of boundary layers as represented by line 124 and the specification of input and output pathways as represented by line 118, dynamic learning between attractor states within and between first level modules as a consequence of the modification of interneuron connections such that such learning influences the formation of first-level modules as represented by the connection as represented by line 112 from step 107 to step 101, the formation of the second level module as represented by the strong connection as represented by the heavy line 114 from step 107 to step 102, the specification off input and output pathways as represented by the connection as represented by line 116 from step 107 to step 103 and line 120 from 107 to step 104. Blocks 100 through 103, inclusive, represent the formation and modification of the structural elements of this embodiment of the NoN whereas steps 104 through 107, inclusive, represent the dynamic attributes of this embodiment of the NoN. As indicated by all lines shown in FIG. 10, this is an iterative process in which all functions or steps represented by all steps shown in FIG. 10 may take place at each iteration, and structure may influence dynamics and vice versa.

Figure 11:
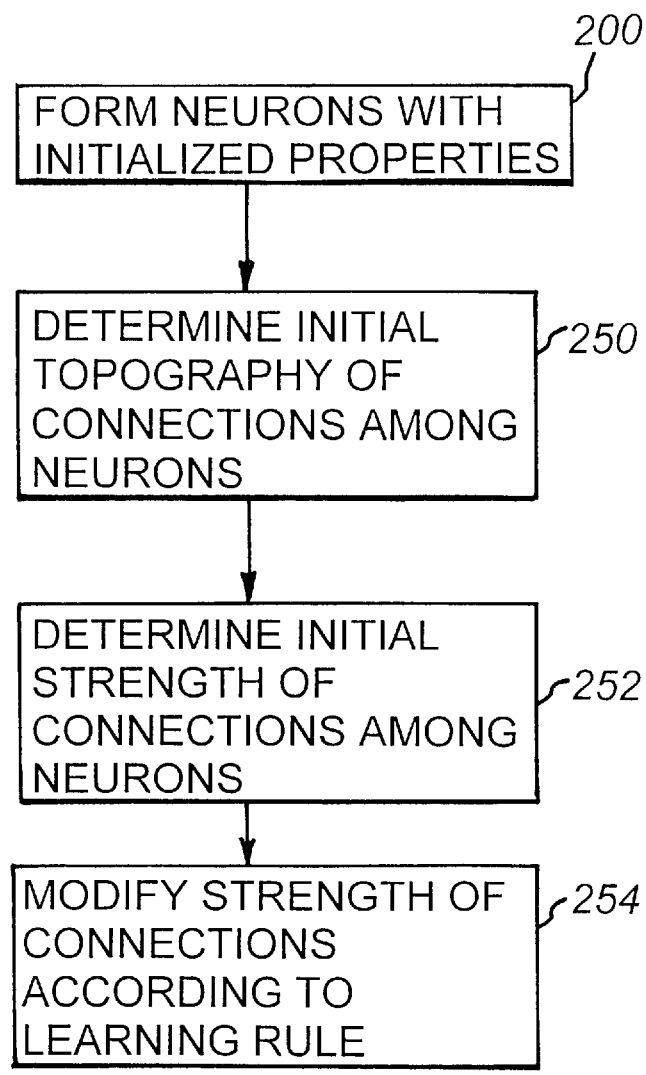
FIG. 11 is a flow diagram showing the steps required to form the neurons and the first level modules of the NoN of the invention.

FIG. 11 is a flow diagram showing in more detail the steps included to realize steps 100 and 101 of FIG. 10. As represented by step 200 of FIG. 11, the design of the basic computational unit, the neuron, is not crucial. For example, simulated firing activity of a neuron may be discrete, for example, binary, or alternatively, continuous; and the characteristics of the firing activity, the refractory period, or attenuation, may vary within a wide range of operability. FIG. 11 is taken to be operating upon a simply representation of a module at the level of a single network, or a first level module of the NoN, consisting of a collection of neurons as, for example, shown in the FIG. 1 embodiment, in this case a BSB Feedback Network. The salient characteristic of the BSB Feedback Network for purposes of the present invention is that the number of stable states is a very small fraction of the number of possible states and that the attractor states are chosen by a non-linear process. Any alternative design, such as a Hopfield network, that also exhibit these characteristics, could be substituted in the present invention. The process of connecting neurons, illustrated by FIG. 11, begins at step 250, where the initial topography of connections is determined. The process then moves to step 252 where the initial strength of connections between neurons is determined. Finally, the process moves to step 254 where the strengths of the connections initialized in step 252 are modified in accordance with standard Hebbian learning or similar learning technique, as also indicated by step 107 and line 112 of FIG. 10.

FIG. 11 shows steps involved in the creation and/or modification of connections between neurons at the single network level, or first level module, of this embodiment of the NoN. Step 200 of FIG. 11 represents the task of forming a plurality of unconnected neurons and initializing their conditions at values that are not crucial to the present invention within a wide range of operability. Step 250 represents the task of establishing initial connections between and among neurons. Because the NoN has the design criterion that connections scale linearly, the number of connections between any one neuron and others is fixed. The predominant fraction of such fixed connections are made to neighboring neurons. However, connections may also be made to more distant neurons such that for example, the number of such connections decreases as the inverse of the average exponential of some measure of the distance between the neurons.

In addition to the topographical aspects of the connections between or among neurons as just discussed, such connections are also characterized by their strength; i.e., how tightly coupled the neurons are. The process of initially establishing the strength of connections is represented by step 252. Generally speaking, the connections must be such that the interconnection of neurons, constituting a single network or first level module, has the capability of attaining many memory states or stable attractor states, that is, that it can store and reliably retrieve distributed memories given a reoccurrence of an input pattern associated with the memory states or stable attractor states.

Step 254 represents the modification of the strengths of these connections in accordance with Hebbian learning techniques or other learning techniques.

Figure 12:
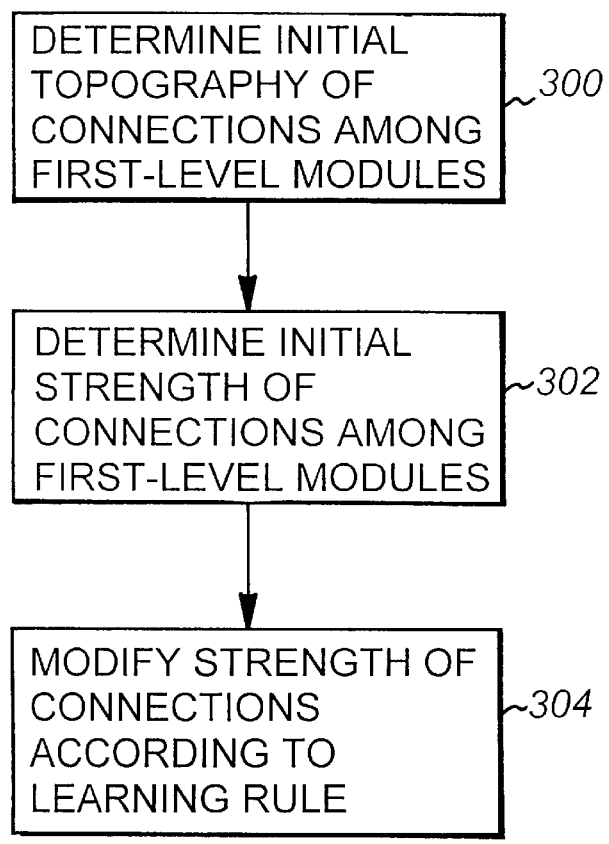
FIG. 12 is a flow diagram showing the steps required to form second level modules of the NoN of the invention.

FIG. 12 is a flow diagram showing in more detail the steps included to realize step 102 of FIG. 10. The process of connecting single networks, or first level modules, illustrated by FIG. 12, begins at step 300, where the initial topography of connections is determined. The process then moves to step 302 where the initial strength of connections between first level modules is determined. Finally, the process moves to step 304 where the strengths of the connections initialized in step 302 are modified in accordance with standard Hebbian learning or similar learning technique, based on modifications of connections between neurons, as also indicated by step 107 and line 114 of FIG. 10. Line 114 of FIG. 10 is shown as pronounced to indicate that the influence of learning is relatively great as compared with such learning as applied to step 101 or step 103 of FIG. 10.

FIG. 12 shows steps involved in the creation and/or modification of connections between single networks, or first level modules, to constitute a second level module. Step 300 of FIG. 12 represents the task of establishing initial connections between and among first level modules. Because the NoN has the design criterion of modularity, the architecture of these connections is similar or the same as the architecture of the connections between and among neurons as represented by step 250 of FIG. 11. Because the NoN has the design criterion that connections scale linearly, the number of connections between any one first level module and others is fixed. However, the number of fixed connections between any one first level module and others may be a different number than the number of fixed connections between any one neuron and another. The predominant fraction of such fixed connections between any one first level module and another are made to neighbor first level modules, as shown in FIG. 2. However, connections may also be made to more distant first level modules such that for example, the number of such connections decreases as the inverse of the average exponential of some measure of the distance between the first level modules.

In addition to the topographical aspects of the connections between or among first level modules as just discussed, such connections are also characterized by their strength; i.e., how tightly coupled the first level modules are; as well as timing delays or phasing of neural output and input between first level modules. The process of initially establishing the strength of connections is represented by step 302. Generally speaking, modules should not be so tightly coupled that the activity in one module is capable of driving the activity in a connected module to the non-linear range. Alternatively speaking, the activity in one first level module should not be capable of destroying the autonomy of a connected first level module by forcing such connected first level module into a new attractor state irrespective of the internal dynamics of such connected first level module.

Step 304 represents the modification of the strengths of these connections in accordance with Hebbian learning techniques or other learning techniques.

Figure 13:
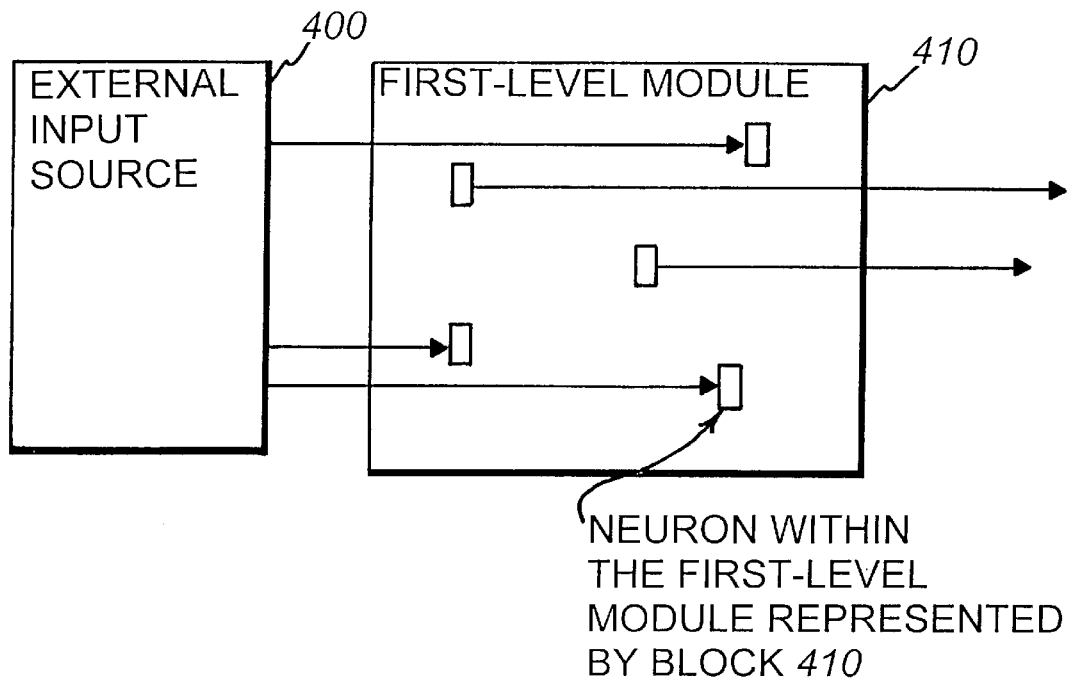
FIG. 13 is a flow diagram showing the steps required to specify input and output pathways to and from the NoN of the invention.

FIG. 13 is a graphical illustration showing in more detail the functions represented by step 103 of FIG. 10 indicating the specification of input and output pathways to and from a first level module. An external input source, represented by block 400 of FIG. 13, and also represented alternatively by "Input Vector f" in FIG. 1, stimulates a subset of neurons of a first level module of the NoN, represented by block 410 and including, but not showing, a feedback function such as shown with respect to Feedback Matrix A in FIG. 1 and also represented by step 506 of FIG. 14. In the variation represented in block 400 of FIG. 13, the stimulation is applied specifically to certain neurons making up the subset, thus constituting a "specific" excitation. However, an equivalent effect may be realized by applying the input stimulus to all of the neurons of a first level module, or a larger subset of them, such that only a smaller subset of neurons, depending upon their properties and states such as threshold firing, respond to the stimulus, thus constituting a "non-specific" excitation. In either variation, the form of the stimulation could be discrete, such as a short, single pulse, or continuous over a relatively long period of time. Output pathways proceed from specific neurons in the first level module represented by block 410 to neurons in other first level modules, not shown, or, alternatively, to an output receiver, also not shown, that may represent the functions, for example, of observing, recording, or utilizing the output of the first level module represented by block 410.

Figure 14:
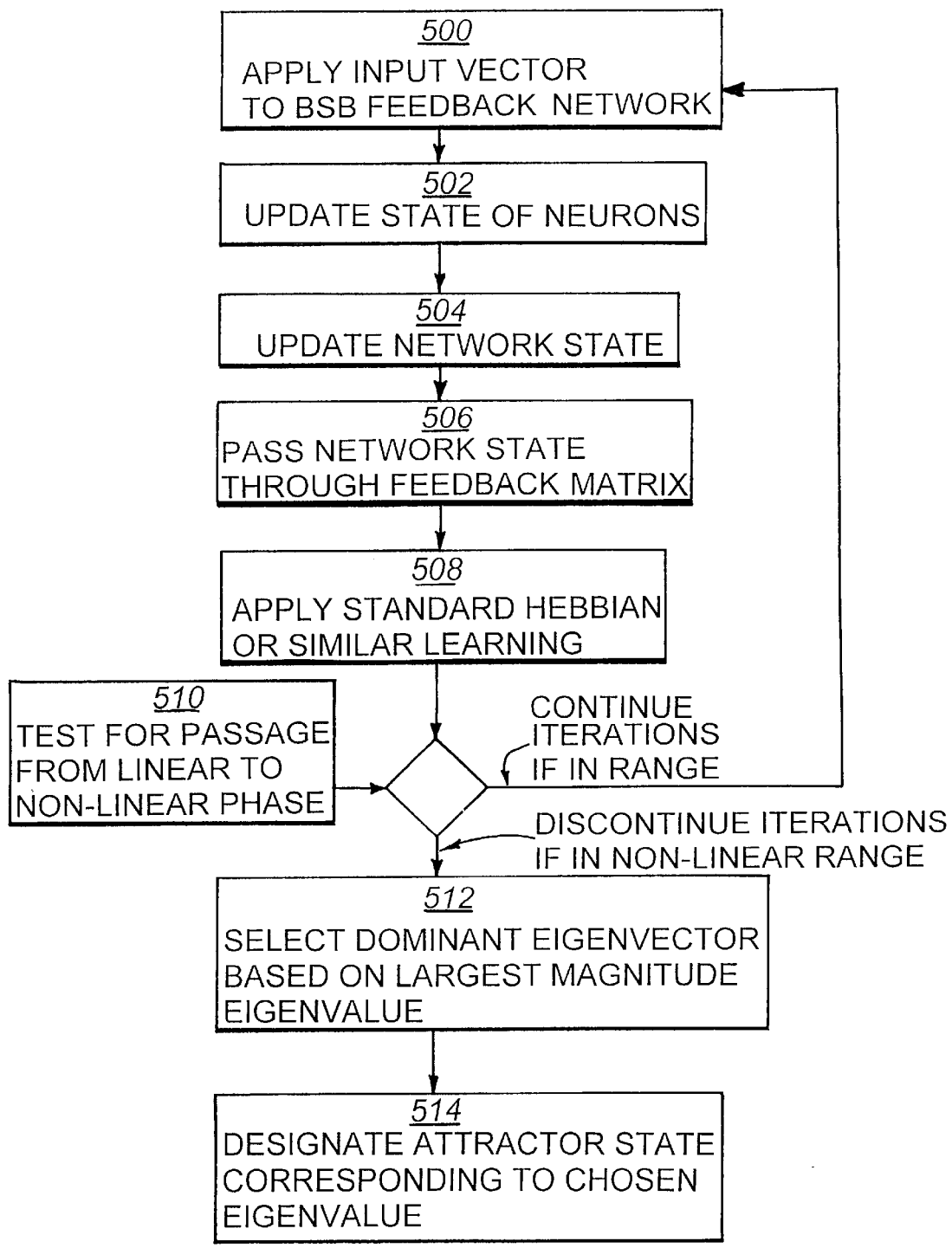
FIG. 14 is a flow diagram showing the steps required to update the first level modules of the NoN of the invention.

FIG. 14 is a flow diagram shown in more detail the steps included in realizing step 104 of FIG. 10. Step 104 applies simultaneously to all first level modules of this embodiment of NoN. As represented by step 500 in FIG. 14, an input vector is applied discretely or continuously throughout the initial learning phase with respect to a first level module, which learning phase constitutes iterations of the functions represented in steps 500, 502, 506, and 508. The input vector may be constituted from an external source, for example as represented by block 400 of FIG. 13, or may be constituted from output pathways from neurons in one or more other first level modules, as shown emanating from specific neurons in the first level neuron represented by block 410 in FIG. 13. In either case, the learning phase proceeds, as indicated in step 510, until the non-linear phase has been reached, at which point the dominant eigenvector is selected, for example, by choosing the eigenvector with the largest magnitude eigenvalue, as indicated in step 512. The module then assumes an attractor state corresponding to the chosen eigenvalue, as indicated in step 514.

As shown in FIG. 14, the process begins at step 500 where an input vector is applied to a BSB Feedback Network, assuming use of a BSB Feedback Network, for example. The process then proceeds to step 502 in which the states of neurons are updated. Then, during step 504, the network state is updated. During step 506 the network state is passed through a feedback matrix such as Feedback Matrix A as shown in FIG. 1. At step 508, standard Hebbian learning is applied, or a similar learning technique is applied. Step 510 represents the steps 500, 502, 504, 506 and 508 are iterated as long as the learning remains in a linear range. Step 510 also represents that, when the learning enters a non-linear range, the learning iterations are discontinued and, as indicated in step 512, the dominant eigenvector is selected, for example, by choosing the eigenvector with the largest magnitude eigenvalue. Then, during step 514, an attractor state is designated corresponding to the chosen eigenvalue in step 512.

Step 105 of FIG. 10 represents a further evolution of first level modules according to the steps shown in FIG. 14. At the point of evolution represented by step 105 of FIG. 10, the achievement of an attractor state in some first level modules influences the activity of other first level modules to move toward or away from attractor states. The result of this capacity for influence is represented in FIG. 5 in which clusters of first level modules in the same attractor state have formed.

Figure 15:
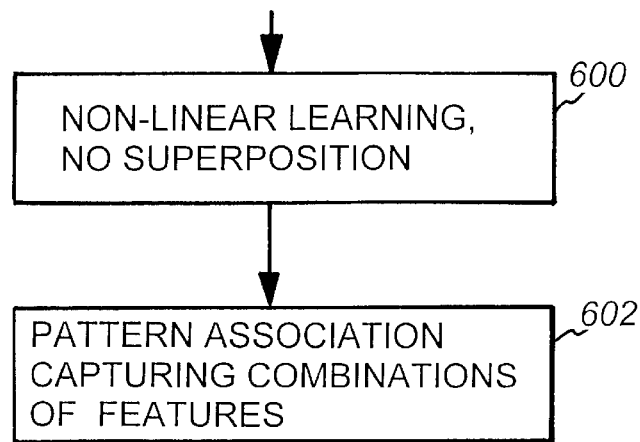
FIG. 15 is a flow diagram showing the steps required to form boundaries by the NoN of the invention.

FIG. 15 is a flow diagram representing boundary formation between modules in different attractor states, as also represented by step 106 of FIG. 10.

Figure 8:
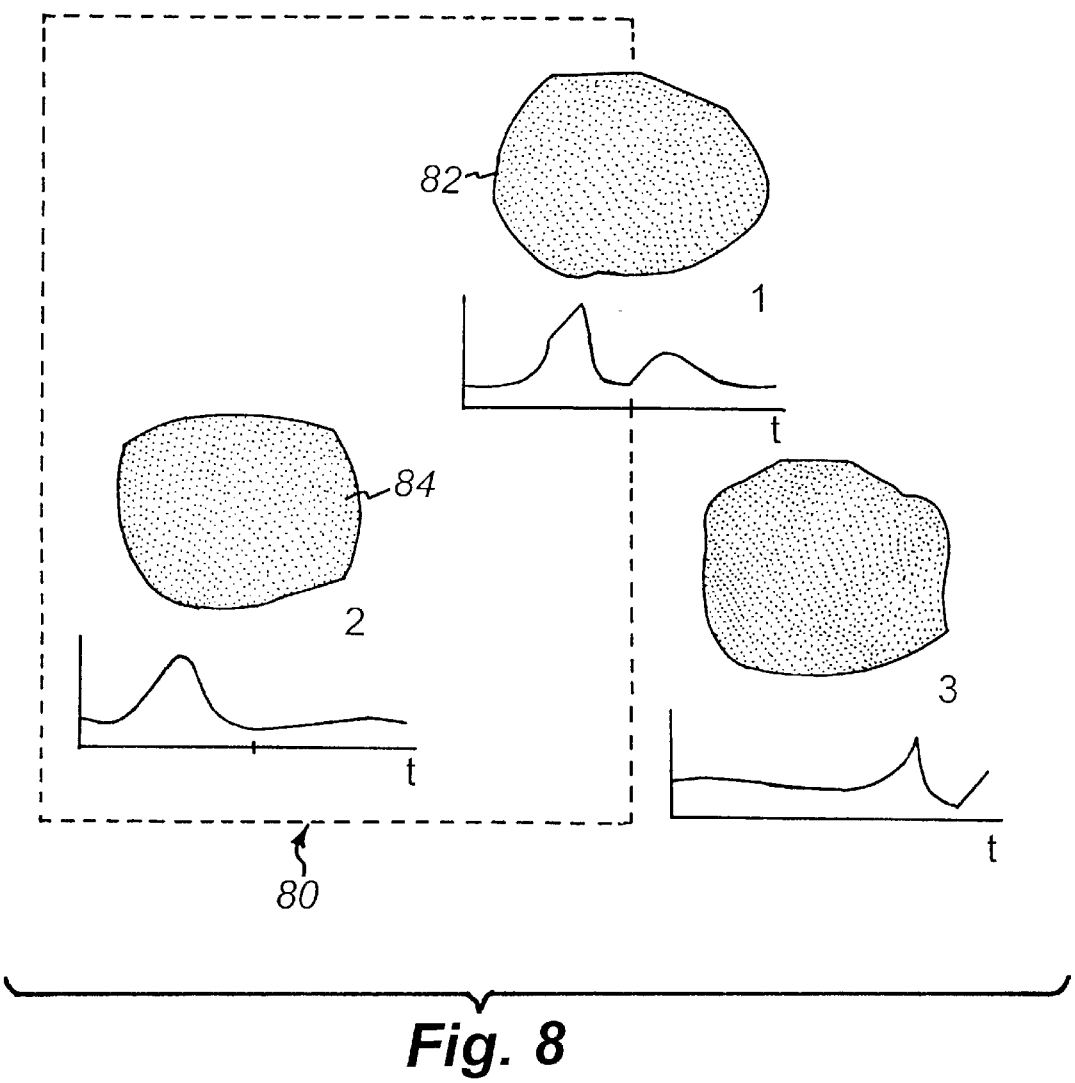
FIG. 8 is a graphical illustration of the NoN of FIGS. 5, 6 and 7 depicting in more detail the development of the boundary layer formation.

Such boundaries can be created very quickly when two waves of attractor states emanating from spatially separated regions of modules meet as shown in FIGS. 6, 7, and 8. When the two waves meet the strength of connections is such that the updating of modules in the boundary region enters the non-linear phase, as shown in step 600 of FIG. 15. Thus, the state of a module in such boundary region is determined not by the simple sum of inputs, as previously described, but by their sum plus an additional factor that is a non-linear combination of them. In this non-linear phase, standard Hebbian or similar error-correcting learning takes place so that the module in the boundary region enters an attractor state during what might be called the first stage of learning.

After the modules in the boundary region have achieved attractor states, the second step of learning may take place, consisting of pattern association as shown in step 602 of FIG. 15. The strengths of connections between and among modules are modified so that the pattern of inputs is reinforced through self-association and stronger associations between each module and its neighbor modules and other, more distantly connected modules. The system thus responds to inputs that constitute a combination of features, each of which emanates from a response from modules that gives rise to the development of attractor states in the boundary region. The spatial regions demarcated by such temporally varying boundaries encode correlated features or combinations of features between first level modules.

In some cases the boundaries may circumscribe a region of the second level module, forming a temporally varying pattern of first level modules that is intermediate in size between first level modules and second level modules. This size can scale continuously within this range. Moreover, there may be formations of such patterns to encoded more complex combinations of features. The encoding of such combinations may help to control and guide the activity of first level modules. The system does not require a priori knowledge of features or combinations of features, but creates them as a result of the two-step describing process described previously.

An exemplary computer software program that implements the NoN of the invention is listed in Appendix A. The program is written in Pascal but the invention is not so limited as it could be written in any programming language.

Figure 16:
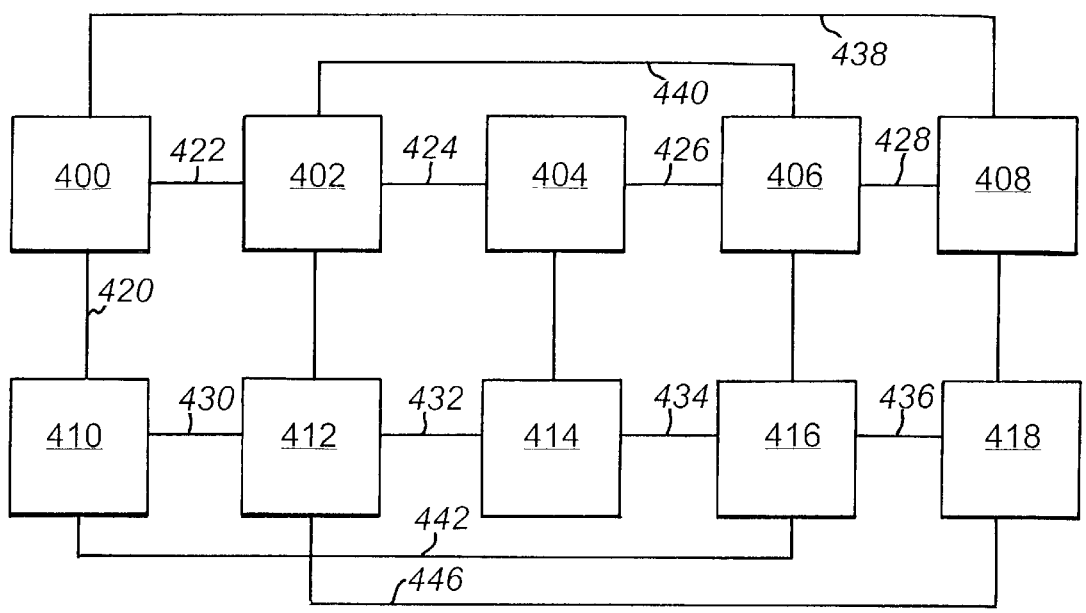
FIG. 16 is a block diagram of a hardware implementation of the NoN of the invention.

FIG. 16 is a block diagram of an exemplary hardware implementation of an NoN of the invention. As shown, the exemplary hardware implementation of FIG. 16 includes 10 modules 400, 402, 404, 406, 408, 410, 412, 414, 416 and 418. Each module 400–418 represents a module of the NoN at a certain level. For example, each module 400–418 could represent a network at the first level, a network of neurons at the second level, a network of networks of neurons at the third level, or higher level modules.

Each module 400–418 has its own processing capabilities and memory storage capacity. During processing, each module independently responds to an input stimuli in a certain way. The modules respond both to external input stimuli and input stimuli received from connected modules. Each module could include a microprocessor and could be implemented by VLSI hardware IC technology.

Exemplary connections between modules are illustrated in FIG. 16. The connections could be bidirectional buses to communicate digital data between the modules or could be electrical lines to communicate analog current or voltage signals. Nearest neighbor connections are shown between spatially adjacent modules. For example, module 400 is connected to module 402 by bus 422. Similarly, module 402 is connected to module 404 by bus 424.

Additionally, a number of spatially distant modules are connected. For example, module 400 is connected to module 408 by bus 438. Module 402 is connected to module 406 by bus 440. Module 410 is connected to module 416 by bus 442. Module 412 is connected to module 418 by bus 446. The connections shown and described are intended to be exemplary. Importantly, the connections should not increase more than linearly as the levels of modules are increased.

Having now described the preferred embodiment of the invention, it should be apparent to those skilled in the art that the foregoing is illustrative only and not limiting, having been presented by way of example only. Numerous other embodiments and modifications thereof are contemplated as falling within the scope of the present invention as defined by appended claims and equivalents thereto.

APPENDIX A                Page 1

```
PROGRAM BSB_Module (Input, Output);

CONST    Dimensionality    = 400;                    (Dimensionality of states.)
         Max_states        = Dimensionality DIV 20;  (Max number of states.)
         Initial_States    = 10;                     (Initial number of states.)
         Nr_of_mod_conns   = 4;       (Number of connections of each module.)
         X_Array_size      = 24;
         Y_Array_size      = 18;
         Nr_of_modules     = X_Array_size*Y_Array_size;
                                      (Total number of modules.)

TYPE     Vector  = ARRAY [1..Dimensionality] OF REAL;

(The C_types describe the dynamics and connections between states.)

C_vector = ARRAY [1..Max_states] OF REAL;

C_Matrix = ARRAY [1..Max_states, 1..Max_states] OF REAL;

(The module is the elementary computing entity in this     )
         (system. It is a model of a large number of units.         )
         (Connections to other modules are by way of vector         )
         (interactions.                                             )

Module    =       RECORD
(In attractor?)              Limited    : BOOLEAN;
(Overall activity.)          Activity   : Vector;
(Strength of states.)        Strengths  : C_Vector;
(Eigenvalues of states.)     Eigenvals  : C_Vector;
(List of states.             States     : ARRAY [1..Max_states] OF Vector;)
(Inputs to a module.)        Inp_Conns  : ARRAY [1..Nr_of_Mod_conns] OF C_Matrix;
(Outputs from a module.)     Outp_Conns : ARRAY [1..Nr_of_Mod_conns] OF C_Matrix;
                             END;

VAR      I, J, K, L,
         Largest,
         Old_seed,
         Shift,
         Interim_seed,
         Seed              : INTEGER;
         St1, St2, St3, St4, St5,
         Initial_coeff,
         Adapting_coeff,
         Diag_coupling,
         Diag_length,
         Eval12,
         Bin_vec_length,
         Limit             : REAL;
         SDChar            : CHAR;
         Output_vector,
         Input_vector      : Vector;
         Modules           : ARRAY [1..Nr_of_modules] OF MODULE;
         New_Modules       : ARRAY [1..Nr_of_modules] OF MODULE;

FUNCTION MTHSRANDOM (VAR Seed: INTEGER): REAL; EXTERN;
```

Page 2

```
FUNCTION Random: REAL;
        BEGIN
        Random:= MTH$RANDOM (Seed);
        END;

FUNCTION Inner_product (A,B: Vector): REAL;
        VAR Sum: REAL;
        I: INTEGER;
        BEGIN
        Sum:= 0;
        FOR I:= 1 TO Dimensionality DO Sum:= Sum + A[I]*B[I];
        Inner_product:= Sum;
        END;

FUNCTION Vector_Length (V: Vector): REAL;
        VAR Sum: REAL;
        I: INTEGER;
        BEGIN
        Sum:= 0;
        FOR I:= 1 TO Dimensionality DO Sum:= V[I]*V[I]+Sum;
        Vector_length:= SQRT (Sum);
        END;

PROCEDURE Clear_screen;   (Erase screen, leave cursor at home.)
        BEGIN
        WRITE (CHR (27), '[', CHR (27),'[2J');
        END;

PROCEDURE Erase_line;   (Erases line to end.)
        BEGIN
        WRITE (CHR (27), '[K');
        END;

PROCEDURE GoToXY (X,Y: INTEGER);   (X = column number, Y = row number.)
        BEGIN
        WRITELN;
        WRITE (CHR (27), '[');
        IF Y<10 THEN WRITE (Y:1) ELSE WRITE (Y:2);
        WRITE (';');
        IF X<10 THEN WRITE (X:1) ELSE WRITE (X:2);
        WRITE ('H');
        END;

PROCEDURE Initialize_display;
    VAR I,J : INTEGER;
        Show: BOOLEAN;
    BEGIN
    Clear_screen;
    GoToXY (1,1);
    WRITE ('                    Network of Networks ');
    FOR I:= 1 TO X_Array_size DO
        FOR J:= 1 TO Y_Array_size DO
        BEGIN
        GoToXY ((1+3*I),(J+3));
```

Page 3

```
            WRITELN ('  -')
            END;
      END;

FUNCTION Vector_Cosine (A,B: Vector): REAL;
      VAR I: INTEGER;
          Lngth, Length_A, Length_B: REAL;
      BEGIN
      Length_A:= Vector_Length (A);   Length_B:= Vector_Length(B);
      Lngth:= Length_A*Length_B;
      IF (Lngth = 0) THEN Vector_Cosine:= 0
                     ELSE Vector_Cosine:= Inner_product (A,B)/Lngth;
      END;

PROCEDURE Make_Random_Binary_Vector (VAR V: Vector);
      VAR I :INTEGER;
      BEGIN
      FOR I:= 1 TO Dimensionality DO
            IF (Random >= 0.5) THEN V[I]:= 1 ELSE V[I]:= -1;
      END;

PROCEDURE Zero_Modules (VAR M: Module);
      VAR I,J,K,L : INTEGER;
      BEGIN {Zero_modules}
      M.Limited:= FALSE;
      FOR I:= 1 TO Dimensionality DO M.Activity [I] := 0;
  (   FOR J:= 1 TO Max_states DO
            FOR I:= 1 TO Dimensionality DO M.States [J][I]:= 0;  )
      FOR J:= 1 TO Max_states DO M.Strengths [J]:= 0;
      FOR J:= 1 TO Max_states DO M.Eigenvals [J]:= 0;

{Zero values for all connections.}
      FOR L:= 1 TO Nr_of_Mod_Conns DO
          FOR J:= 1 TO Max_states DO
              FOR I:= 1 TO Max_states DO BEGIN
                                         M.Inp_Conns [L, J, I]:= 0;
                                         M.Outp_Conns[L, J, I]:= 0
                                         END;
      END; {Zero Modules}

PROCEDURE Initialize;
      VAR I, J, K, L: INTEGER;
          Coupling: REAL;
      BEGIN
      Limit:= 2;
      Bin_vec_length:= SQRT(Dimensionality);   {Length of binary vector.}
      Diag_length:= Limit*SQRT(Dimensionality);  {Distance to corner.}

FOR I:= 1 To Nr_of_Modules DO Zero_Modules (Modules[I]);
      Initialize_display;
      FOR K:= 1 TO Nr_of_Modules DO
          BEGIN
          FOR J:= 1 TO 10 DO Modules[K].Eigenvals[J]:= 1.3-0.01*J;
          {Set up state connections.}
          FOR I:= 1 TO Max_states DO
```

Page 4

```
            FOR L:= 1 TO Nr_of_mod_conns DO
                BEGIN
                    Modules[K].Inp_conns[L]  [I,I]:= Diag_coupling;
                    Modules[K].Outp_conns[L] [I,I]:= Diag_coupling;
                END;
        END;
    FOR K:= 0 TO 17 DO
        BEGIN
        Coupling:= 0.2;
        Modules[12+24*K].Eigenvals[12]:= Eval12;
        Modules[12+24*K].Outp_conns[1] [1,12]  := -Coupling;
        Modules[12+24*K].Outp_conns[1] [12,12] :=  Coupling;
        Modules[12+24*K].Outp_conns[2] [12,1]  :=  Coupling;
        Modules[12+24*K].Outp_conns[2] [1,12]  := -Coupling;
        Modules[12+24*K].Outp_conns[3] [12,2]  :=  Coupling;
        Modules[12+24*K].Outp_conns[3] [2,12]  := -Coupling;
        Modules[12+24*K].Outp_conns[4] [1,12]  := -Coupling;
        Modules[12+24*K].Outp_conns[4] [12,12] :=  Coupling;

Modules[13+24*K].Eigenvals[12]:= Eval12;
        Modules[13+24*K].Outp_conns[1] [2,12]  := -Coupling;
        Modules[13+24*K].Outp_conns[1] [12,12] :=  Coupling;
        Modules[13+24*K].Outp_conns[2] [12,1]  :=  Coupling;
        Modules[13+24*K].Outp_conns[2] [1,12]  := -Coupling;
        Modules[13+24*K].Outp_conns[3] [12,2]  :=  Coupling;
        Modules[13+24*K].Outp_conns[3] [2,12]  := -Coupling;
        Modules[13+24*K].Outp_conns[4] [2,12]  := -Coupling;
        Modules[13+24*K].Outp_conns[4] [12,12] :=  Coupling;
        END;

FOR K:= 1 TO Nr_of_Modules DO New_Modules[K]:= Modules[K];
    END;

{Approximation to length of state vector, represented as components.}
FUNCTION Overall_Length (M: Module): REAL;
    VAR I: INTEGER;
        Sum: REAL;
    BEGIN
    Sum:= 0;
    FOR I:= 1 TO Max_States DO Sum:= M.Strengths[I]*M.Strengths[I] + Sum;
    Overall_length:= SQRT (Sum);
    END;

{Looks for largest vector component.}
FUNCTION Largest_value (M: Module): INTEGER;
    VAR I, Largest : INTEGER;
    BEGIN
    Largest:= 1;
    FOR I:= 1 TO Max_states DO
        IF (ABS(M.Strengths[I]) > ABS(M.Strengths[Largest])) THEN Largest:= I;
    Largest_value:= Largest;
    END;

PROCEDURE Initialize_Module (Pattern_number   : INTEGER;
                             Starting_location: INTEGER);
```

```
    VAR I, J, S1, S2, S3, S4, S5 : INTEGER;
        Sum: REAL;
        Input_vector : Vector;
    BEGIN
    {Zero strengths.}
    FOR J:= 1 TO Max_states DO
        Modules[Starting_location].Strengths[J]:= 0;

S1:= Pattern_number;

Modules[Starting_location].Strengths[S1]:= St1;
    { Modules[Starting_location].Strengths[S2]:= St2;
      Modules[Starting_location].Strengths[S3]:= St3;
      Modules[Starting_location].Strengths[S4]:= St4;
      Modules[Starting_location].Strengths[S5]:= St5; }

{Normalize starting length.}
    Sum:= SQRT (St1*St1 (+ St2*St2 + St3*St3 + St4*St4 + St5*St5));
    FOR J:= 1 TO Max_states DO
        Modules[Starting_location].Strengths[J]:= Diag_length*Initial_coeff*
                                Modules[Starting_location].Strengths[J]/Sum;
    Modules[Starting_Location].Limited:= FALSE;
    END;

PROCEDURE Iteration (N: INTEGER);
    VAR I, J, K, X, Y: INTEGER;
        Int_strengths: C_vector;
        Left, Right,
        Top, Bottom : BOOLEAN;

PROCEDURE Neighbor_geometry;
        BEGIN
        IF (( (K-1) MOD X_array_size) = 0) THEN Left:= TRUE ELSE Left:= FALSE;
        IF (( (K-1) MOD X_array_size) = (X_array_size - 1))
                            THEN Right:= TRUE ELSE Right:= FALSE;
        IF (( (K-1) DIV X_array_size) = 0) THEN Top:= TRUE ELSE Top:= FALSE;
        IF (( (K-1) DIV X_array_size) = (Y_array_size-1))
                            THEN Bottom:= TRUE ELSE Bottom:= FALSE;
        END;

PROCEDURE Module_Interaction (CM: C_matrix;   {Coupling matrix.}
                                  CV: C_vector;   {Input strengths.}
                              VAR OCV: C_Vector); {Output strengths.}
        VAR I, J: INTEGER;
        BEGIN
        FOR I:= 1 TO Max_states DO OCV[I]:= 0;    {Zero vector }
        FOR I:= 1 TO Max_states DO
            FOR J:= 1 TO Max_states DO OCV[I]:= OCV[I] + CM[I,J]*CV[J];
        END;

{This procedure assumes only four nearest neighbors contribute.  }
    {                           *  (1:K-X_array_size)                }
    {              (2:K-1)    * K *   (3:K+1)                        }
    {                           *  (4:K+X_array_size)                }
```

Page 6

```
PROCEDURE Neighbor_interaction (VAR Interaction: C_vector);
    VAR I,J: INTEGER;
        Cont_Up, Cont_Down, Cont_left, Cont_right: C_Vector;
    BEGIN
    FOR I:= 1 TO Max_states DO BEGIN Cont_up[I]:= 0; Cont_down[I]:= 0;
                                     Cont_left[I]:= 0; Cont_right[I]:= 0;
                                END;
        IF (NOT Top) THEN
            Module_Interaction (Modules[K-X_Array_size].Outp_conns[1],
                                Modules[K-X_Array_size].Strengths,
                                Cont_up);
        IF (NOT Left) THEN
            Module_Interaction (Modules[K-1].Outp_conns[2],
                                Modules[K-1].Strengths,
                                Cont_left);
        IF (NOT Right) THEN
            Module_Interaction (Modules[K+1].Outp_conns[3],
                                Modules[K+1].Strengths,
                                Cont_right);
        IF (NOT Bottom) THEN
            Module_Interaction (Modules[K+X_Array_size].Outp_conns[4],
                                Modules[K+X_Array_size].Strengths,
                                Cont_down);

FOR I:= 1 TO Max_states DO
            Interaction[I]:= Cont_up[I] + Cont_down[I] +
                             Cont_left[I] + Cont_right[I];
    END;

BEGIN {Iteration.}
FOR K:= 1 TO Nr_of_modules DO
    BEGIN
    Neighbor_geometry;
    {Adaptation term. Only in saturation.}
    Largest:= Largest_value (Modules[K]);

{Put in a little random noise into the adaptation.}
    IF  (New_Modules[K].Limited = TRUE)
    THEN   Modules[K].Eigenvals[Largest]:=
           Adapting_coeff*Modules[K].Eigenvals[Largest]*(1+0.01*(Random-0.5));
    New_Modules[K].Eigenvals[Largest]:= Modules[K].Eigenvals[Largest];

{Compute result of interactions, iteration.}
    Neighbor_interaction (Int_strengths);
    FOR I:= 1 TO Max_states DO
       New_Modules[K].Strengths[I]:= Int_strengths[I] +
               Modules[K].Strengths[I]*Modules[K].Eigenvals[I];

{Check for saturation.}
    IF (Overall_length(New_Modules[K]) >= Diag_length)
    THEN BEGIN
        New_Modules[K].Limited:= TRUE;
        FOR J:= 1 TO Max_states DO New_Modules[K].Strengths[J]:= 0;
        Largest:= Largest_value (Modules[K]);
```

```
                New_Modules[K].Strengths[Largest]:= Diag_length;

X:= 4 + 3*( (K-1) MOD X_Array_size );
                Y:= 4 + ( (K-1) DIV X_Array_size );
                GoToXY (X,Y);
                WRITE (Largest:3);
                {WRITE (Modules[K].Eigenvals[Largest]:2:1);}
                END
          ELSE BEGIN
                New_Modules[K].Limited:= FALSE;
                X:= 4 + 3*( (K-1) MOD X_Array_size );
                Y:= 4 + ( (K-1) DIV X_Array_size );
                GoToXY (X,Y);
                WRITE (' -');
                END;
          END;
     {Take new results and place them in Modules for next iteration.}
     FOR K:= 1 TO Nr_of_Modules DO Modules[K]:= New_Modules[K];
     END; {Iteration.}

FUNCTION Fully_saturated: BOOLEAN;
  VAR K: INTEGER;
      Found_unsaturated: BOOLEAN;
  BEGIN
  Found_unsaturated:= FALSE;
  FOR K:= 1 TO Nr_of_Modules DO
      IF (Modules[K].Limited = FALSE) THEN Found_unsaturated:= TRUE;
  IF Found_Unsaturated  THEN Fully_saturated:= FALSE
                        ELSE Fully_saturated:= TRUE;
  END;

BEGIN {Main Program.}
WRITE ('Seed for RN generator: ');     READLN (Seed);
Old_Seed:= Seed;
WRITE ('Diag Coupling          : ');   READLN (Diag_coupling);
WRITE ('Adapt Coeff            : ');   READLN (Adapting_coeff);
WRITE ('Eigenvalue 12          : ');   READLN (Eval12);
{WRITE ('Initial coefficient   : ');   READLN (Initial_coeff);}
Initial_coeff:= 0.5;
St1:= 1; St2:= 1;
FOR L:= 5 TO 5 DO
  BEGIN
  Initialize;
  GoToXY (1,1); WRITE ('Trial: ', L:4);
  Interim_seed:= Seed;
  GoTOXY(3,22); WRITE ('Diag C: ', Diag_coupling:4:3,
                       '  Adap C: ', Adapting_coeff:4:3);
  GoToXY(30,22); WRITE (' 2 components, eq wt.',
                        ' Eval12: ', Eval12:4:3);
  I:= 1;
  REPEAT GoToXY (1,2);
         WRITELN ('Iteration:',I:4);
         Initialize_Module (1,(217+L));
         Initialize_Module (2,(240-L));
```

```
        {Initialize_Module (3,(193+L));}
        {Initialize_Module (4,(216-L)); }
        Iteration (I);
        I:= I+1;
  UNTIL ( (Fully_saturated) OR (I>150) );

GoTOXY(3,23); WRITE ('Final State. <CR> To continue.');
  READLN;
  END;
END.  (Main Program.)
```

What is claimed is:

1. A NoN comprising:

a neuron having processing capabilities;

a first level module including a network of a plurality of interconnected neurons, the first level module also having processing capabilities; and a second level module including a network of interconnected networks of interconnected neurons, the second level module also having processing capabilities;

wherein the first and second level modules are interconnected through neuron to neuron connections such that simultaneous processing can be carried out in neurons and first and second level modules.

2. The NoN as claimed in claim 1 further including means for increasing the levels of interconnected modules while increasing connections between the modules no more than linearly.

3. The NoN as claimed in claim 1 further including means for forming non-predefined functional components across modules based on input stimuli during computing by the NoN.

4. The NoN as claimed in claim 1 further including means for forming a boundary between a first module having a first memory state and a second module having a second memory state such that the module comprising the boundary attains a third memory state distinct from the first and second memory states.

5. The NoN as claimed in claim 1 further including means for forming spatially related functional components across modules based on temporal processing sequences and means for forming temporally related functional components through module processing based on spatially related modules.

6. The NoN as claimed in claim 1 wherein connections exist between both spatially local and distant modules.

7. The NoN as claimed in claim 1 wherein modules at different levels are self similar to one another.

8. A method for forming a NoN system comprising the steps of:

forming a neuron having processing capabilities; forming a first level module including a network of a plurality of interconnected neurons, the first level module also having processing capabilities; forming a second level module including a network of interconnected networks of interconnected neurons, the second level module also having processing capabilities;

specifying input and output pathways to and from neurons so that an external input may excite the system to provide an output;

processing first level and second level module evolution based on neural network dynamics;

further processing first level module evolution to a stage at which the achievement of an attractor state in at least one first level module influences the activity of at least one other first level module toward or away from an attractor state; and forming a boundary layer of first level modules between other first level modules that influence the activity of at least one other first level module.

9. The method for forming a NoN system as claimed in claim 8 wherein the steps of forming a neuron and forming a first level module include the steps of:

forming neurons with initialized properties;

determining an initial topography of connections among neurons;

determining an initial strength of connections among neurons; and modifying the strength of connections according to a learning rule.

10. The method for forming a NoN system as claimed in claim 8 wherein the step of forming a second level module includes the steps of:

determining an initial topography of connections among first level modules;

determining an initial strength of connections among first level modules; and modifying the strength of connections according to a learning rule.

11. The method for forming a NoN system as claimed in claim 8 wherein the step of processing includes the steps of:

(a) applying an input vector to a feedback network;

(b) updating a state of neurons;

(c) updating a state of a network containing the neurons;

(d) passing the network state through a feedback matrix;

(e) applying a standard learning technique;

(f) testing for passage from a linear to a non-linear range;

(g) if a linear range, then select a dominant eigenvector based on a largest magnitude eigenvalue and designating an attractor state corresponding to the selected eigenvector.

12. An NoN system comprising:

means for forming a neuron having processing capabilities;

means for forming a first level module including a network of a plurality of interconnected neurons, the first level module also having processing capabilities;

means for forming a second level module including a network of interconnected networks of interconnected neurons, the second level module also having processing capabilities;

means for specifying input and output pathways to and from neurons so that an external input may excite the system to provide an output;

means for processing first level and second level module evolution based on neural network dynamics;

means for further processing first level module evolution to a stage at which the achievement of an attractor state in at least one first level module influences the activity of at least one other first level module toward or away from an attractor state; and means for forming a boundary layer of first level modules between other first level modules that influence the activity of at least one other first level module.

* * * * *